United States Patent [19]
Akiyama et al.

[11] Patent Number: 5,717,684
[45] Date of Patent: Feb. 10, 1998

[54] DISK CARTRIDGE HAVING CHAMFERED WALL PORTION

[75] Inventors: Noboru Akiyama; Katsumi Kameda, both of Tokyo-to, Japan

[73] Assignee: Dai Nippon Insatsu Kabushiki Kaisha, Tokyo-to, Japan

[21] Appl. No.: 531,063

[22] Filed: Sep. 20, 1995

Related U.S. Application Data

[63] Continuation of Ser. No. 234,701, Apr. 28, 1994, abandoned, which is a continuation of Ser. No. 931,849, Aug. 18, 1992, abandoned, which is a division of Ser. No. 647,571, Jan. 28, 1991, Pat. No. 5,166,922.

[30] Foreign Application Priority Data

| Jan. 29, 1990 | [JP] | Japan | 2-007307 |
| Jan. 29, 1990 | [JP] | Japan | 2-007308 |
| Jan. 30, 1990 | [JP] | Japan | 2-007704 |
| Jan. 30, 1990 | [JP] | Japan | 2-007705 |
| Feb. 14, 1990 | [JP] | Japan | 2-013182 |
| Feb. 26, 1990 | [JP] | Japan | 2-018572 |
| Feb. 26, 1990 | [JP] | Japan | 2-018573 |
| Feb. 26, 1990 | [JP] | Japan | 2-018574 |
| Mar. 15, 1990 | [JP] | Japan | 2-026505 |
| Mar. 15, 1990 | [JP] | Japan | 2-064869 |
| Sep. 26, 1990 | [JP] | Japan | 2-100858 |

[51] Int. Cl.⁶ .............................. G11B 3/70; G11B 23/03
[52] U.S. Cl. .................................. 369/291; 360/133
[58] Field of Search .......................... 369/291; 360/133; 206/444

[56] References Cited

U.S. PATENT DOCUMENTS

| 4,799,121 | 1/1989 | Takahashi | 369/291 |
| 4,888,761 | 12/1989 | Ohta | 360/133 |
| 4,935,834 | 6/1990 | Muehlhausen | 360/133 |
| 5,034,844 | 7/1991 | Shiba et al. | 360/133 |
| 5,053,905 | 10/1991 | Kiji et al. | 360/133 |
| 5,077,625 | 12/1991 | Shiba et al. | 360/133 |
| 5,121,380 | 6/1992 | Fujita et al. | 369/291 |
| 5,175,726 | 12/1992 | Imokawa | 360/133 |
| 5,196,978 | 3/1993 | Wasko et al. | 360/133 |

*Primary Examiner*—Craig A. Renner
*Assistant Examiner*—Allen Cao
*Attorney, Agent, or Firm*—Ladas & Parry

[57] ABSTRACT

A disk cartridge with a case comprises upper and lower shell halves, each of which has a head insertion hole and a spindle insertion hole. A pair of projections are provided inwardly at a joint portion between the two holes. The peripheral wall portions of the spindle insertion hole are extended inwardly toward tips of the projections in an arched form. An almost annular projection is provided along a periphery of the spindle insertion hole to increase a supporting portion for supporting the disk when the spindle is taken off from the spindle insertion hole. The inner peripheral walls of the head insertion hole are chamfered. A corner of the groove is chamfered to prevent the corner of the groove from being caught by a part of the guide frame.

6 Claims, 31 Drawing Sheets

F I G. 50
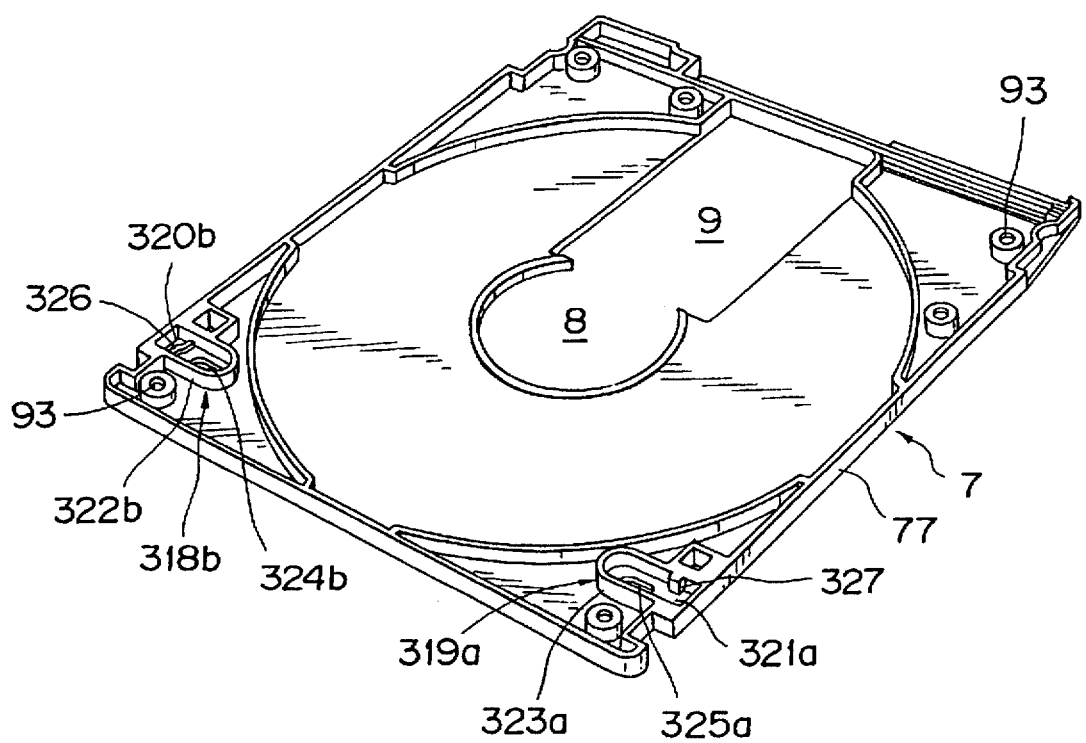

DISK CARTRIDGE HAVING CHAMFERED WALL PORTION

This is a continuation of application Ser. No. 08/234,701 filed on Apr. 28, 1994, now abandoned, which is a continuation of application Ser. No. 07/931,849 filed on Aug. 18, 1992, now abandoned, which is a divisional of application Ser. No. 07/647,571 filed on Jan. 28, 1991 now U.S. Pat. No. 5,166,922.

BACKGROUND OF THE INVENTION

The present invention relates to a disk cartridge for encasing a recording medium such as an optical disk or a magnetic disk.

In general, a magnetic disk or an optical disk is encased in a cassette case made of two shell halves. A hole into which a spindle for rotating the disk is to be inserted is formed in the center portion of the cassette case. Adjacent to the spindle hole, a head insertion hole into which a writing/reading head is to be inserted is formed in the radial direction to traverse the recording surface of the disk. The head insertion hole is opened and closed by a shutter slidingly provided on the cassette case.

The front end of the cassette case has a guide portion along which is reciprocatingly moved a slider to hold the shutter for opening and closing the head insertion hole and the spindle insertion hole. The slider is in a rectangular bar-shape and holds the bent portion of the shutter. The shutter has a pair of side plate portions extending parallel to each other from the opposite sides of the bent portion thereof in order to open and close the above two holes of the cassette case.

There is provided a twist coil spring between the front portion of the slider and the cassette case for urging the shutter in the direction where the two holes are closed.

As mentioned above, the opposite ends of the twist coil spring are held at the front end of the slider and at the front corner of the cassette case, respectively. However, if the disk cartridge is subjected to an impact force, e.g., when it is dropped on a floor, the twist coil spring may be disconnected from the front end of the slider and the corner of the cassette case. Further, an operation for connecting the coil spring to the slider and the cassette case is troublesome, and dust may enter the cassette case when the case is dropped to move the shutter to open the two holes of the cassette case.

A reading/writing device (player) for receiving the disk cartridge has a pair of drive pins for opening and closing the shutter, and, however, neither a relational movement between the drive pins and the shutter nor a charging movement of the disk cartridge into the reading/writing device is smooth.

The disk is held, at its center portion, by the spindle in a floating condition in the cassette case, and, however, the disk cannot be held stably therein. Moreover, when the disk is rotationally held, the information recording surface of the disk sometimes abuts against the inner surface of the case to cause a scratch and a damage thereonto. When the disk happens to strongly abut against the edge of the head insertion hole, the information recording surface of the disk may suffer a damage. When the peripheral edge of the disk in the case strikes against the corner of a substantially circular surrounding wall, the peripheral edge thereof may suffer a damage.

In addition, there is provided a writing protection mechanism in the case for preventing old information having been already recorded on the disk from being erased by recording new information onto the disk. However, there may occur a case that some parts of the writing protection mechanism are assembled upside down in the case.

SUMMARY OF THE INVENTION

It is an object of this invention to provide a disk cartridge in which a spring for urging a shutter does not easily come off from the shutter and a corner of a case and can be easily assembled in the case.

It is another object of this invention to provide a disk cartridge in which a drive pin of a reading/writing device can open and close the disk cartridge smoothly.

It is still another object to provide a disk cartridge which can hold stably a disk therein without generating a scratch or damage on the disk.

It is still another object to provide a disk cartridge which has a writing protection mechanism capable of being easily assembled.

According to one aspect of this invention, there is provided a disk cartridge with a shutter which is slidably mounted on a case and urged by an elastic spring in a direction where an opening portion formed in the case is closed in order to open and close the opening portion thereof, wherein the shutter is mounted onto the case through a slider which is slidably accommodated at front portion of the case, the slider having one end with an insertion hole for receiving a bent end provided at an end of an arm of the elastic spring, the insertion hole being bent to form a hook hole in a hook-shape in longitudinal direction of the slider and provided, at an inlet thereof with a sharp projection extending inwardly thereof for holding the bent end of the elastic spring and a cut away path communicated with the bent hole and extended in longitudinal direction of the slider to guide the arm of the spring, the inlet of the insertion hole having a width for permitting the bent end to pass therethrough.

According to another aspect of this invention, there is provided a disk cartridge with a shutter which is slidably mounted on a case and urged by an elastic spring in a direction where an opening portion formed in the case is closed in order to open and close the opening portion thereof, wherein the shutter is mounted onto the case through a slider which is slidably accommodated at front portion of the case, the slider having one end with an insertion hole for receiving a bent end provided at an end of an arm of the elastic spring, the insertion hole having a closed space for holding therein the bent end thereof extending in widthwise direction of the slider and a cut away path extended in longitudinal direction of the slider to be communicated with the closed space to guide the arm of the spring.

According to still another aspect of this invention, there is provided a disk cartridge with a shutter which is slidably mounted on a case and urged by an elastic spring in a direction where an opening portion formed in the case is closed in order to open and close the opening portion thereof, wherein a bent end is formed at an end of an arm of the elastic spring, a pair of hook members being provided near or at a part of peripheral side wall of the case so as to be extended parallel to each other in a direction where the elastic spring is expanded and shrunken, a pair of hooks being provided at distal ends thereof, respectively, to form an insertion inlet for the bent end thereof which is held in a space defined by the hook members.

According to still another aspect of this invention, there is provided a disk cartridge with a shutter which is reciprocatingly provided on a case through a slider in order to open and close an opening portion of the case, wherein a curved surface is provided at a corner of a rear end of the slider in a direction where the shutter opens the opening portion of the case, a Fear end of the shutter, corresponding to the rear end of the slider being cut away to form a cut portion from which the curved surface is projected outwardly.

According to still another aspect of this invention, there is provided a disk cartridge with a shutter connected to a slider movable on a guide portion provided on front side of a case for opening and closing an opening portion of the case, the slider having a receiving recess for receiving a drive pin provided in a reading/writing device to move the shutter through the slider, wherein the case has a shutter locking mechanism for locking the shutter at its closing position.

According to still another aspect of this invention, there is provided a disk cartridge having an upper and a lower shell halves assembled together with each other to form a case to hold a disk therebetween, the case having a spindle insertion hole at its center position, into which a spindle for rotating the disk with a hub while holding the hub of the disk is inserted, the spindle insertion hole being opened and closed by a movable shutter, wherein a projection is formed, on an inner wall of the case, at a position separated from a peripheral edge of the spindle hole and opposed to a non-recording surface of the disk so as to surround the spindle hole.

According to still another aspect of this invention, there is provided a disk cartridge with a case having a spindle insertion hole, at its center portion, for receiving a spindle for rotating a disk accommodated in the case, wherein a projection is formed, on an inner wall of the case, along a peripheral edge of the spindle insertion hole or at a position near the spindle insertion hole so as to be opposed to a non-recording surface of the disk, the projection being covered with an outer layer having at least one of slippery and elastic properties.

According to still another aspect of this invention, there is provided a disk cartridge with a case having a spindle insertion hole, at its center portion, for receiving a spindle for rotating a disk accommodated in the case, wherein a film having a slippery property such as PET is attached onto an inner wall of the case along a peripheral edge of the spindle insertion hole or at a position near the spindle insertion hole.

According to still another aspect of this invention, there is provided a disk cartridge with a case comprising an upper and a lower shell halves, each of which has a circular surrounding wall on its inner wall for accommodating a disk, wherein a joint portion between a side peripheral wall and the surrounding wall is curved or chamfered.

According to still another aspect of this invention, there is provided a disk cartridge with a groove on each side of a peripheral wall of a case for receiving a drawing arm provided in a guide frame of a reading/writing device to draw the case thereinto, wherein a corner of the groove is chamfered to prevent the corner of the groove from being caught by a part of the guide frame.

According to still another aspect of this invention, there is provided a disk cartridge with a case comprising an upper and a lower shell half for accommodating a disk therein and a writing protection mechanism for preventing new information from being recorded again onto a recorded surface of the disk onto which old information has been already recorded, wherein the mechanism comprises: a movable plug having a block-like main body held movably in the case and at least one leg extended from an end of an end face of the plug in a direction where the plug is moved; a guide part provided in the case for holding reciprocatingly the main body of the plug therein; a projection provided on an inner surface of the guide part for selectively holding the movable plug at two positions while cooperating with the leg of the plug; an opening means which is provided in the guide part so as to be closed and opened when the plug is located at one position and at another position, respectively; and a raised portion provided on a flat wall with which the other end face with no leg of the plug is engaged when the plug is property assembled in the guide part.

According to still another aspect of this invention, there is provided a disk cartridge with a case comprising an upper and a lower shell halves for accommodating a disk and an opening portion provided, on each shell half, so as to be opened and closed by a shutter, wherein each shell half is formed by an injection molding in which a mold having a single injection hole is used, the injection hole being formed in the mold, at a position corresponding to a part on the case which is covered with a certain member of the disk cartridge.

Further objects, features and other aspects of this invention will be understood from the following detailed description of the preferred embodiments of this invention with reference to the drawings.

BRIEF DESCRIPTION OF THE DRAWINGS

In the accompanying drawings:

FIG. 50 is a perspective view of the inner side of the lower shell half having two guide portions for the two protection plugs;

DETAILED DESCRIPTION OF THE INVENTION

First Embodiment

Figure 1:
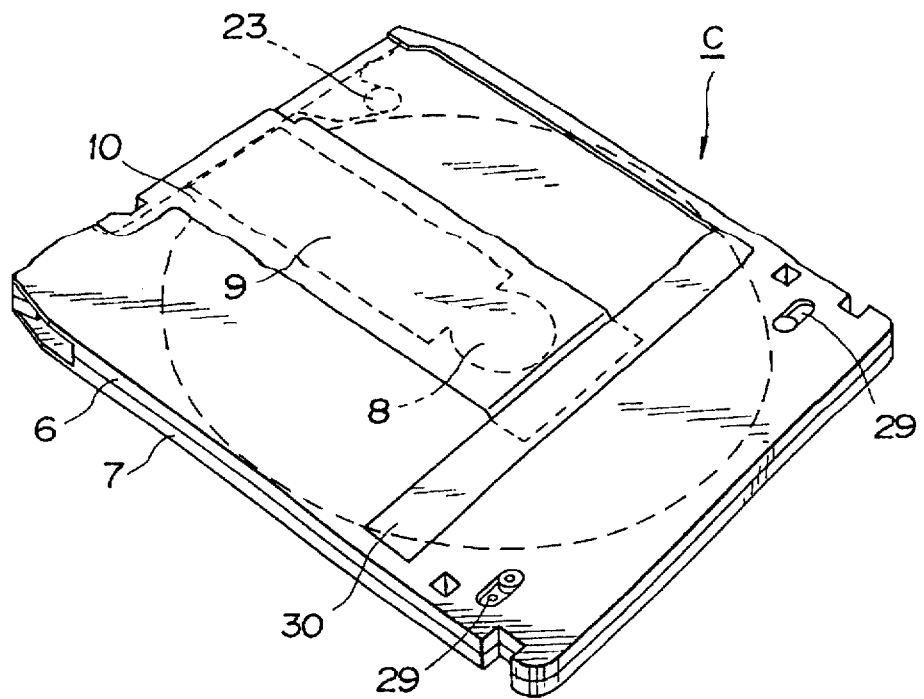
FIG. 1 is a perspective view of a disk cartridge according to this invention.
Figure 2:
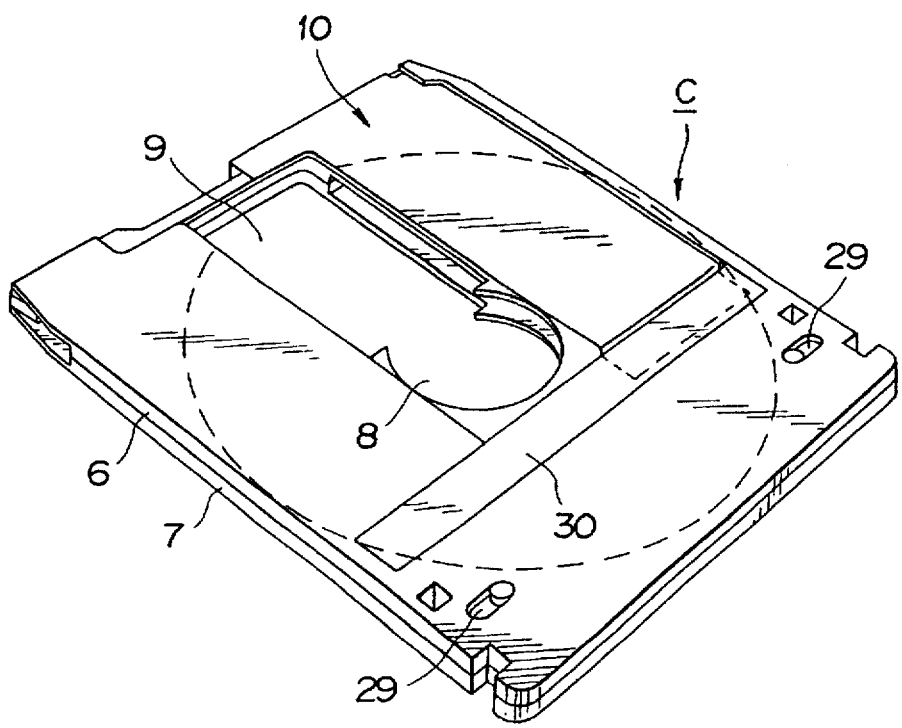
FIG. 2 is a partial perspective view of the disk cartridge when a shutter is opened.

As shown in FIGS. 1 and 2, a disk cartridge C for encasing an optical disk, has an upper and a lower shell halves 6, 7 which are assembled in alignment with each other to form a case. The center portion of the case has a spindle insertion hole 8 and a head insertion hole 9 disposed adjacent to the spindle insertion hole 8 to receive a reading/writing head (not shown) to form an opening portion of the case.

Figure 3:
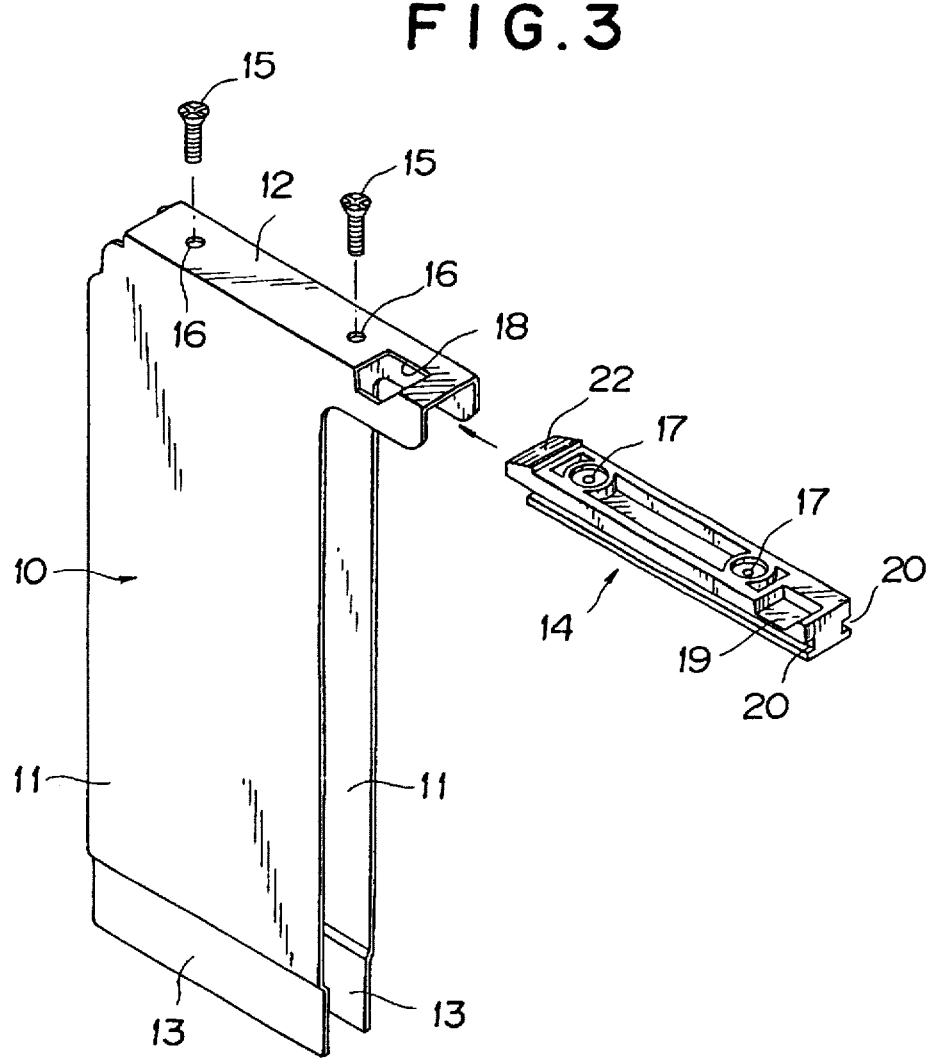
FIG. 3 is an exploded perspective view of the shutter and a slider.

In order to open and close the opening portion, a shutter 10 is provided slidably in the left and right directions on the disk cartridge C. The shutter 10 is, as shown in FIG. 3, so formed that a stainless plate is bent at its center (top plate 12) to form two closing plates 11, 11 opposite to each other. Each closing plate has a slide plate 13 at its lower end. The slide plate 13 is slidably guided by a retaining plate 30 attached to the surface of each shell half. The top plate 12 is held by an elongated slider 14 through two screws 15, 15 each of which is passed through an opening 16 to be inserted into a receiving hole 17 provided in the slider 14.

The rear portion of the top plate 12 (right portion as viewed in FIG. 3) has an opening 18 in registration with a receiving recess 19 provided at the rear portion of the slider when the slider 14 and the top plate 12 are combined together. The recess 19 receives a drive pin P1 (FIG. 4) provided in a reading/writing device (player) (not shown) to open and close the shutter 10 when the disk cartridge C is charged into the player. Each receiving hole 17 of the slider 14 is opposed to an opening of the top plate 12.

Figure 4:
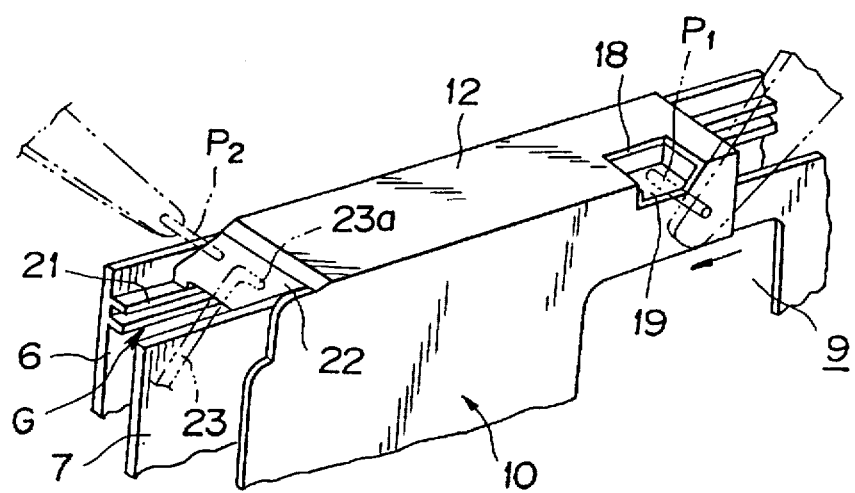
FIG. 4 is a perspective view of a guide portion of the disk cartridge.

On the opposite side faces of the slider 14 are provided a pair of guide grooves 20, 20 which engage with two guide rails 21, 21 in a guide portion formed on the front end of the disk cartridge on the side of the player. The slider 14 has a slanted surface 22 at its front end, as shown in FIG. 4, so that a drive pin P2 disposed opposite to the drive pin P1 can slide smoothly on the front portion of the slider 14. That is, when the disk cartridge C is charged into the player, one of the drive pins P1, P2 (pin P1 in FIG. 4) is received in the receiving recess 19 of the slider 14 through the opening 18 of the top plate 12. Then, the pin P1 is moved in the left direction as viewed in FIG. 4 to open the spindle insertion hole 8 and the head insertion hole 9. At that time, the other drive pin P2 rides on the slanted surface 22 to be moved in the right direction. As a result, the two pins P1, P2 are moved in the opposite directions, and passed by each other.

Thus, the slanted surface 22 of the slider 14 permits the pin P2 to slide smoothly on the slider 14. In this case, the pin P2 which does not function to open and close the opening portion of the case is called a useless pin. In contrast, when the disk cartridge C is turned over to be charged into the player, the pin P2 functions to open and close the opening portion thereof while the pin P1 is called a useless pin.

Figure 5:
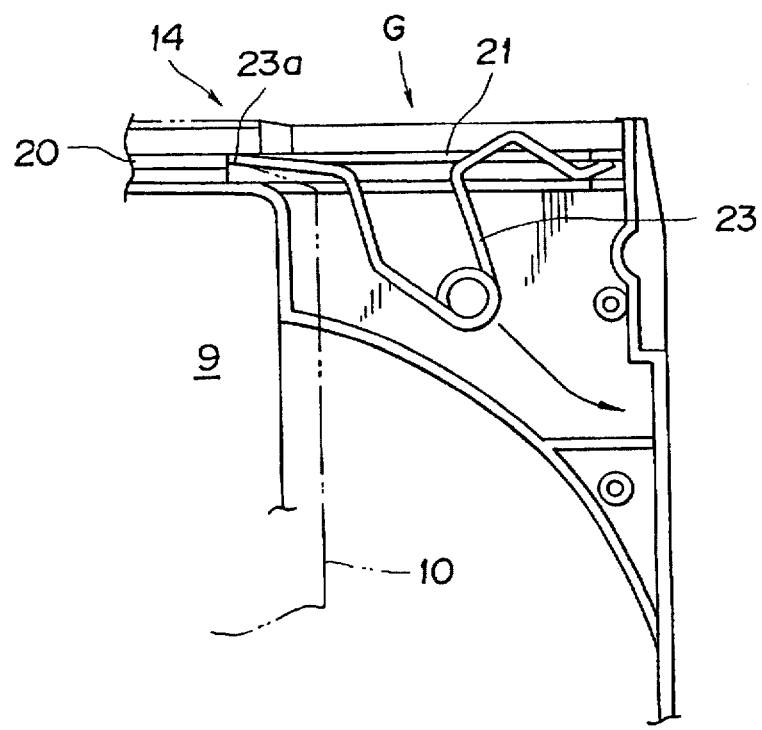
FIGS. 5 and 6 are two operational views showing a function of a twist coil spring when the shutter is opened and closed.
Figure 6:
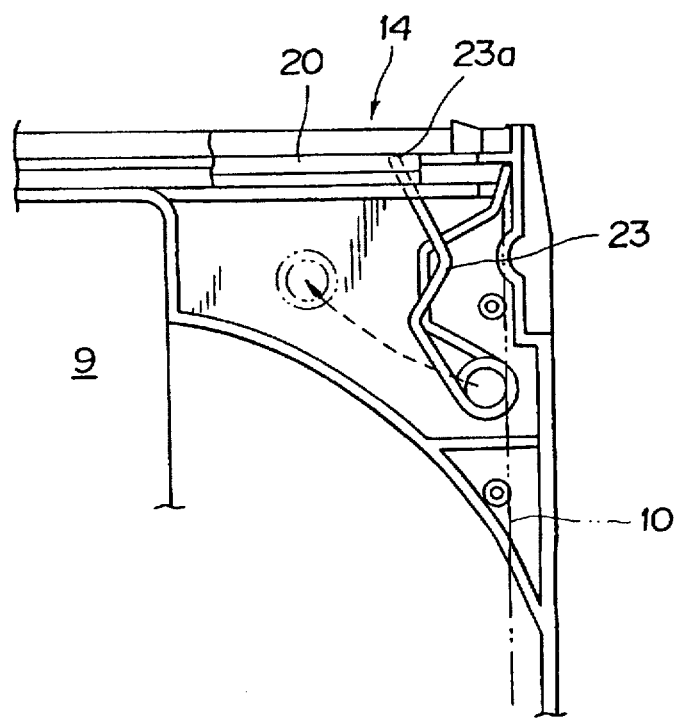
Figure 7:
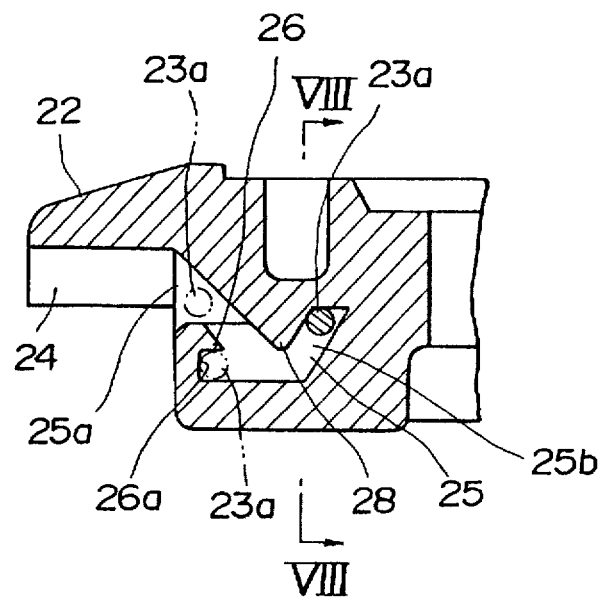
FIG. 7 is a longitudinally sectional view of a front portion of the slider.
Figure 8:
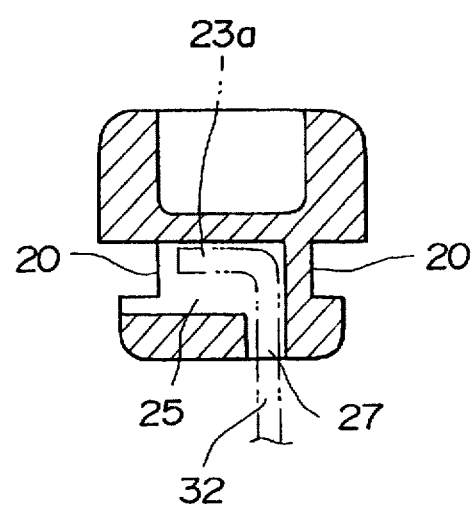
FIG. 8 is a cross sectional view taken along the line VIII—VIII.
Figure 9:
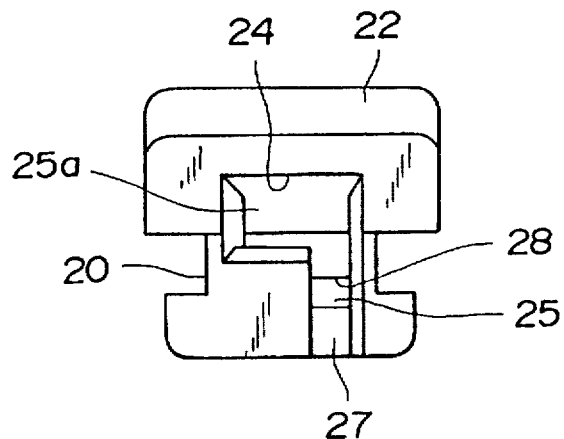
FIG. 9 is a front view of the slider.
Figure 10:
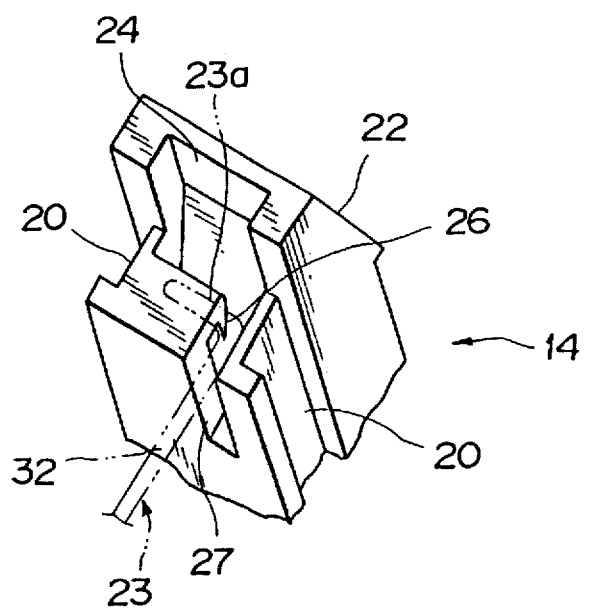
FIG. 10 is a perspective view of the front portion of the slider.

As shown in FIGS. 1, 5 and 6, on the right side of the front end of the disk cartridge is accommodated a twist coil spring 23 which is provided between the front corner of the disk cartridge C and the front portion of the slider 14 to urge the shutter 10 toward the direction where the opening portion of the disk cartridge is closed. The front end of the slider 14 is in the form of a pent roof and has a recess 24 at its lower side as shown in FIGS. 7 and 10. At the base portion of the front end thereof is provided an insertion hole 25 adjacent to the recess 24 for receiving a bent end 23a of the coil spring 23. The insertion hole 25 has a substantially rectangular shape in its cross section, which can pass the bent end 23a and a substantial V-shape (hook-shape) as a whole in its longitudinal direction to form a hook hole 28b which has a projecting portion 28 at its turning point. That is, the insertion hole 28 has a downslope part slanting downwardly from an inlet 25a at the right end of the recess 24 and an upslope part slanting upwardly from the lower end of the downslope part. At the lower position of the inlet 25a of the downslope part thereof is provided a sharp projection 26 which projects inwardly of the insertion hole 25 to form a space 26a for holding the bent end 23a of the spring 23. There is provided a cut away path 27 which extends in the longitudinal direction of the slider 14 to communicate with the hook hole 25b. When the bent portion 23a of the coil spring 23 is inserted into the insertion hole 25, the bent portion 23a is passed through the inlet 25a in a state wherein the bent portion 23a is extended horizontally in the widthwise direction of the slider 14 and wherein an arm 32 of the coil spring 23 is extended vertically to be accommodated in the path 27.

The bent portion 23a can be thus inserted smoothly deeply into the insertion hole 25. When the shutter 10 is in a closing state, the bent portion 23a is held in the space 26a by the sharp projection 26 projecting in the longitudinal direction of the slider 14. The coil spring 23 is expanded and shrunken, as shown in FIGS. 5 and 6, in response to the reciprocal movement of the shutter 10. The bent portion 23a of the spring 23 is accommodated deeply in the upslope space of the hook hole 25b when the shutter opens the opening portion of the disk cartridge C in a state wherein the coil spring is shrunken as shown in FIG. 6. In contrast, as mentioned above, the bent portion 23a is held by the sharp projection 26 in the space 26a as shown in FIG. 7, when the opening portion is closed by the shutter 10. In this manner, the bent portion 23a is reliably held in the insertion hole during the reciprocal movement of the shutter 10.

In FIGS. 1 and 2, a reference numeral 29 indicates a writing protection part for preventing new information from being recorded on the recording surface of the disk. As mentioned above, the insertion hole 25 is bent in a V-shape to form the projecting portion 28 at the turning position of the hook 25b and the sharp projection 26 projecting toward the inside of the insertion hole 25. Therefore, when the bent end of the coil spring 23 is once inserted in the insertion hole 25, it is not easily disconnected from the insertion hole 25 even if the coil spring 23 is moved abruptly and an impact force is exerted on the disk cartridge when it is dropped on a floor. Further, the sharp projection 26 located near the inlet 25a of the insertion hole 25 has an upper face to guide the bent end 23a of the coil spring 23 toward inside of the insertion hole 25 when the bent end 23a is accommodated in the insertion hole 25. Therefore, an assembling operation of the coil spring 23 and the shutter 10 is performed easily and speedily.

Second Embodiment

Figure 11:
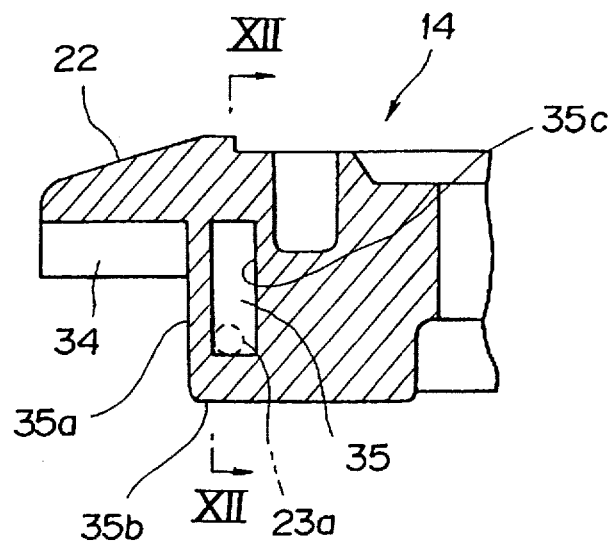
FIG. 11 is a longitudinally sectional view of a front portion of a slider, showing another embodiment with respect to a connecting portion of the slider and the twist coil spring.
Figure 12:
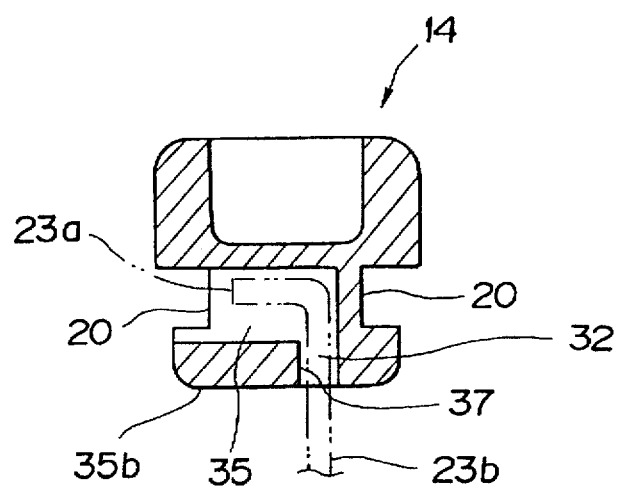
FIG. 12 is a cross sectional view taken along the line XII—XII.

The connecting portion between the bent end 23a of the coil spring 23 and the front end of the slider 14 may be constructed as shown in FIGS. 11 to 14. That is, the front end of the slider 14 has a pent roof-shape provided with a recess 34 at its lower face, and the base portion of the pent roof-shape is provided with an insertion hole 35 having a closed space 35c for accommodating the bent end 23a of the coil spring 23. The insertion hole 35 is in the shape of a rectangular parallelepiped, and has, as shown in FIG. 11, a length for receiving the bent end 23a thereof in the longitudinal direction of the slider 14. At the front end walls 35a, 35b in which the closed hole 35C is formed is provided a cut away path 37 for introduction of the bent end 23 thereof and for swinging motion of the arm 32 thereof during the opening and closing motion of the shutter 10. The width of the path is determined slightly larger than that of the arm 32 of the coil spring 23.

Figure 13:
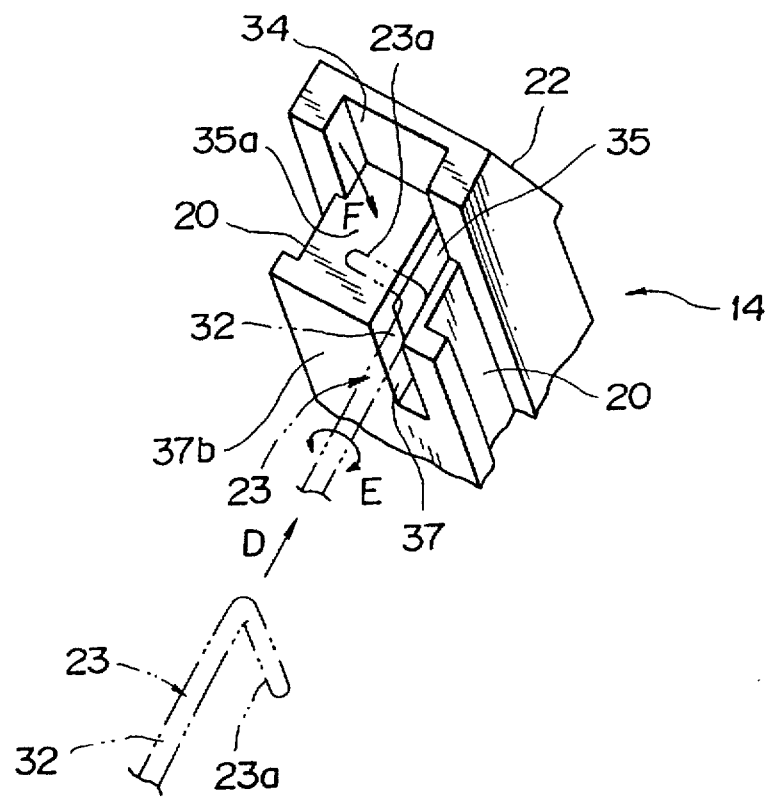
FIG. 13 is a perspective view of the slider shown in FIG. 11.
Figure 14:
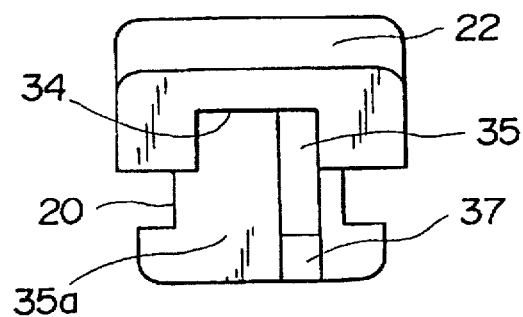
FIG. 14 is a front view of the slider shown in FIG. 11.

When the bent end 23a thereof is accommodated into the insertion hole 35, the bent end 23a is extended along the bottom opening of the cut away path 37 to be inserted into the right end space of insertion hole 35 as viewed in FIG. 13, and the bent end 23a is then turned by about 90 degrees in the direction indicated by an arrow E.

The coil spring 23 is expanded and shrunken with the bent end 23a thereof directed in the widthwise direction of the slider 14. Further, the arm 32 thereof is swung along two opposite walls defining the cut away path 37. Therefore, the bent end 23a thereof is always held in the insertion hole 35 so as not to be disconnected therefrom. The bent end 23a thereof can be also inserted into the insertion hole 35 in the longitudinal direction (arrow F) of the slider 14 through the inlet of the cut away path 37 in the wall 35a extended vertically as viewed in FIG. 11.

The above structure of the connecting portion between the bent end 23a thereof and the front end of the slider 14 permits the bent end 23a to be reliably held in the insertion hole 35 even if the coil spring is moved abruptly and the disk cartridge is dropped to be subjected to an impact force.

Third Embodiment

Figure 17:
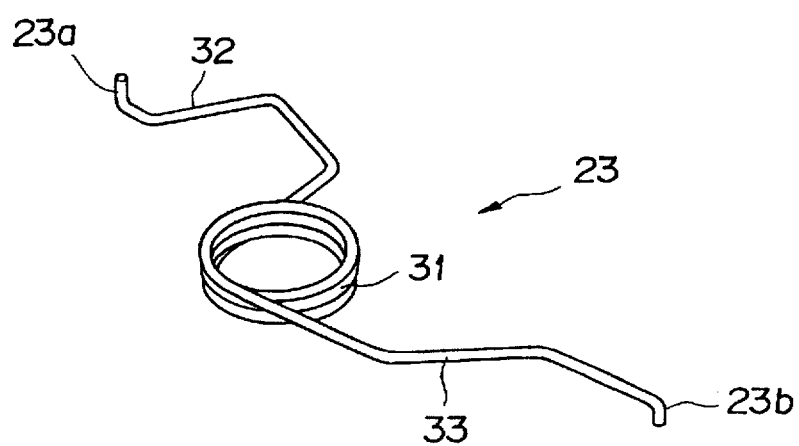
FIG. 17 is a perspective view of the twist coil spring.

The twist coil spring 23 is, as shown in FIG. 17, made of an elastic wire, and has a center coil portion 31 and two arms 32, 33 extended to the opposite sides of the center coil portion 31. The ends of the arms 32, 33 are bent perpendicularly to those arms 32, 33 to form two bent ends 23a, 23b, respectively.

Figure 15:
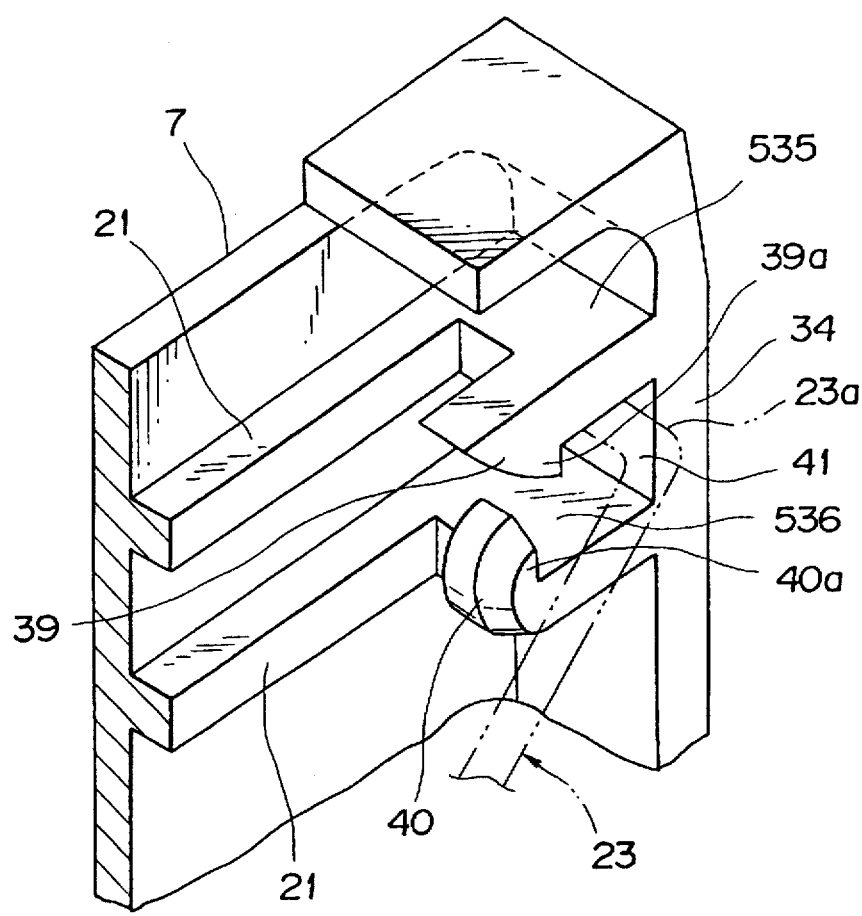
FIG. 15 is a perspective view of a connecting portion of the twist coil spring and a lower shell half of the disk cartridge.
Figure 16:
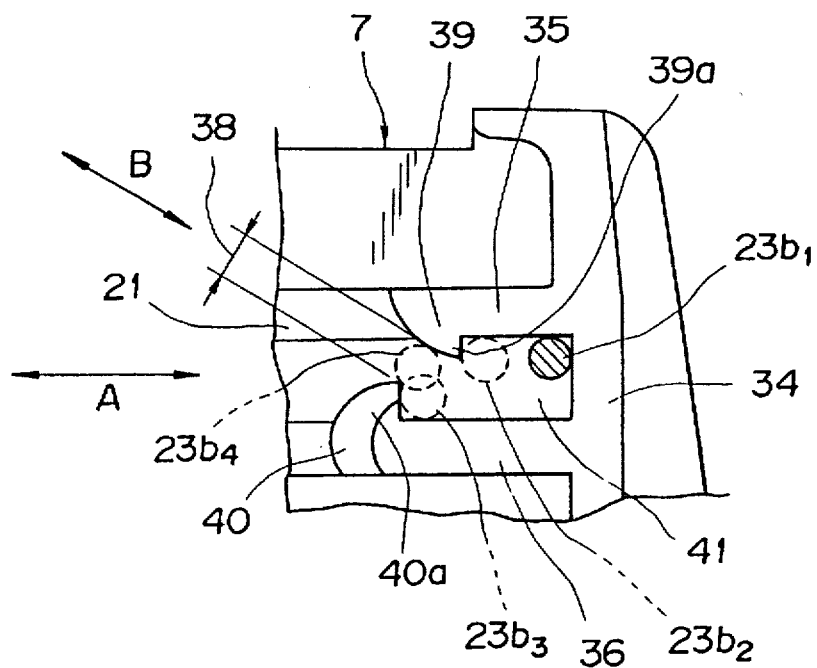
FIG. 16 is an explanatory view showing a function of the connecting portion shown in FIG. 15.

As shown in FIGS. 15 and 16, the lower shell half 7 of the disk cartridge C has, at its front corner, a pair of hook members 535, 536 extending parallel to each other in the longitudinal direction of the shell half 7 and formed at the end portions of the guide rails 21, 21. At the respective ends of the hook members 535, 536 are, as shown in FIG. 16, provided a pair of hooks 39, 40 opposed to each other, which form cooperatively an insertion inlet 38 open in the slanted direction B with respect to the widthwise direction A. The two hooks 39, 40 have two sharp projections 39a, 40a projected inwardly in a space 41 defined by the hook members 535, 536, respectively. The bent end 23b of the coil spring 23 is kept in the space 41.

Figure 18:
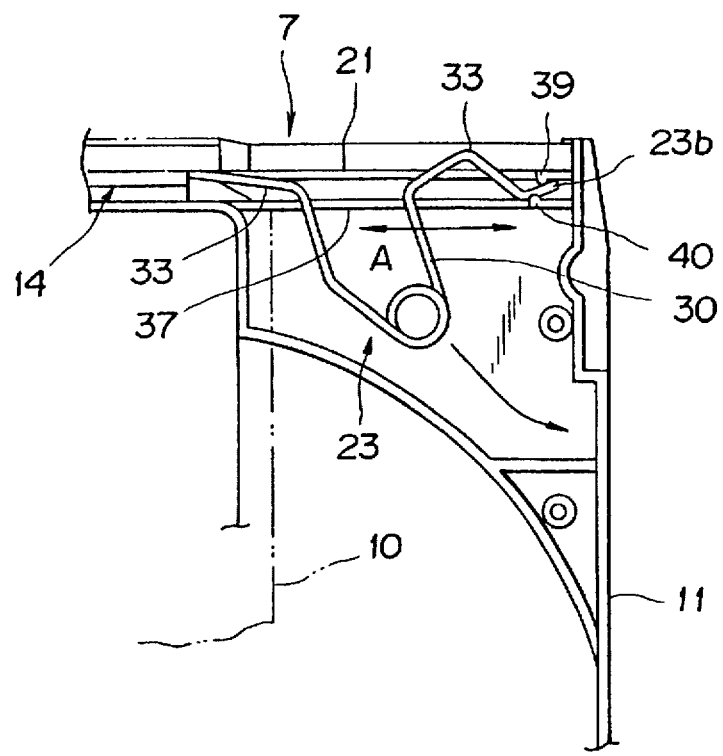
FIGS. 18 and 19 are two explanatory views showing a function of the connecting portion shown in FIG. 15 when the shutter is opened and closed.
Figure 19:
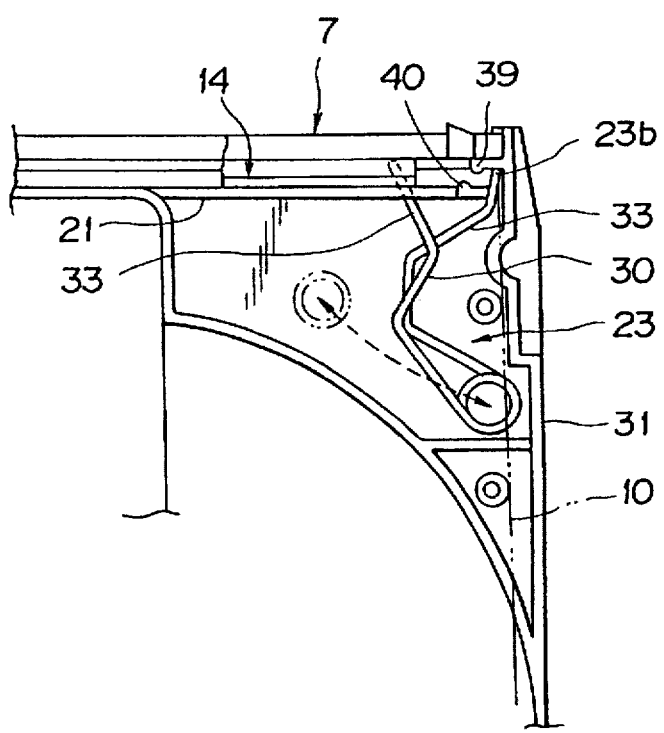

When the coil spring 23 is expanded and shrunken as shown in FIGS. 18 and 19, the bent end 23b thereof is moved between a position $23b_1$ indicated by a solid line and either a position $23b_2$ or a position $23b_3$. However, since the insertion inlet 38 is open to the slanted direction B with respect to the widthwise direction of the case, the bent end 23b is never disconnected from the space 41 after it is once accommodated therein.

When the disk cartridge C is assembled, the bent end 23b is inserted into the space 41 in the slanting direction B as shown by a position $23b_4$ of a dotted line.

The above structure makes it possible to reliably hold the bent end 23b in the space 41, and the bent end 23b can be easily and speedily inserted when the disk cartridge is assembled.

Fourth Embodiment

Figure 20:
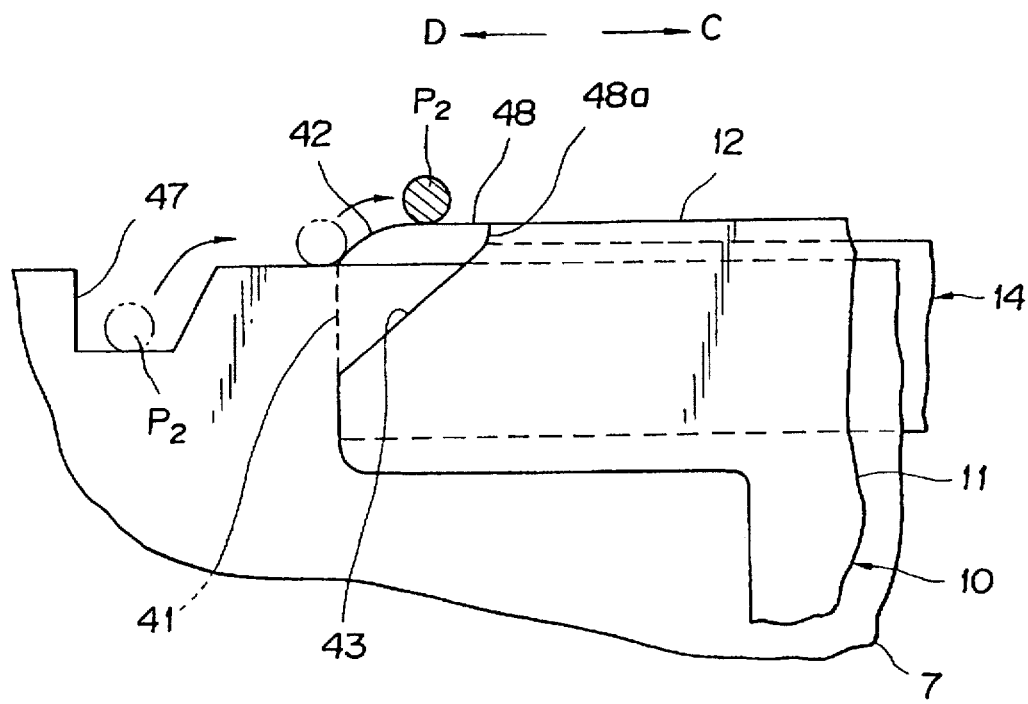
FIGS. 20 and 21 are two explanatory views showing a state of engagement of a drive pin and the slider, respectively.
Figure 21:
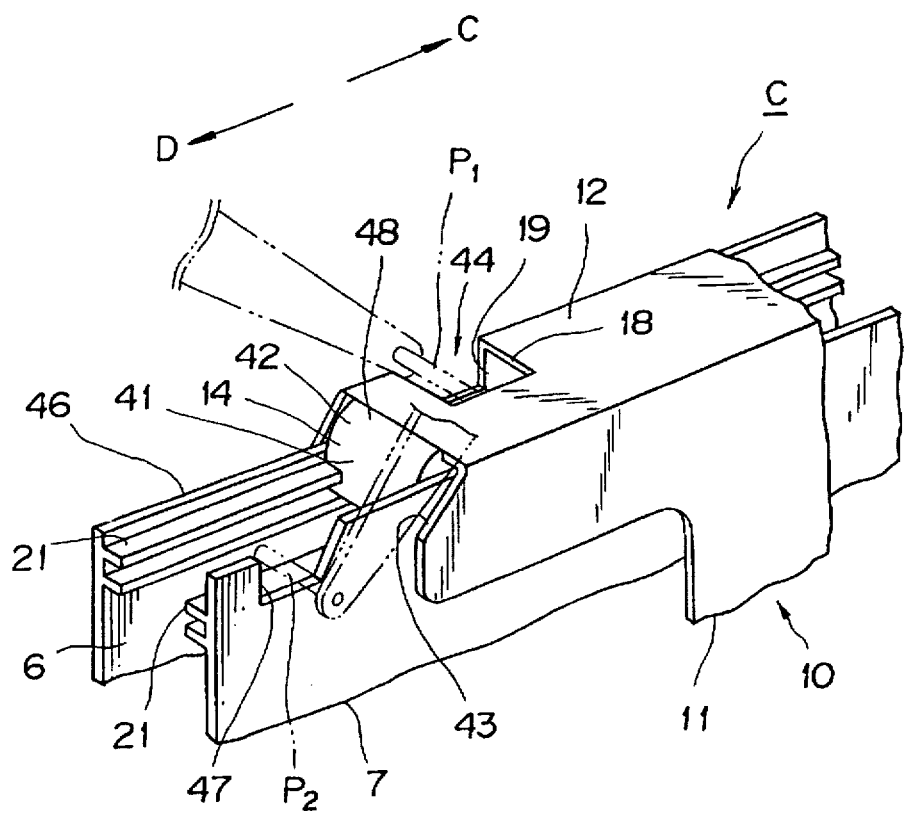

A connecting portion between the rear end of the slider 14 and the shutter 10 may be formed as shown in FIGS. 20 and 21. That is, a curved surface 42 is formed at the upper corner (the joint portion between the top face 48 of the slider 14 and the rear end face 41 thereof) of the rear end of the slider 14. The rear upper projected end portion of the shutter 10 is cut away obliquely to form a cut portion 43 from which the smoothly curved surface 42 is projected outwardly. As mentioned above, the slider 14 has, neap its rear end, a receiving hole 44 for receiving either the drive pin P1 or P2 provided in the player. At the two rear positions of the guide portion G of the upper and lower shell halves 6, 7 are provided two recesses 46, 47 for holding either the pin P1 or P2 which is useless. In FIG. 21, the two drive pins P1, P2 correspond to the upper and lower half shells 6, 7, respectively, and when the disk cartridge C is charged into the player, the drive pin P1 is received in the receiving hole 44 to open the shutter 10 while the opposite drive pin P2 which is useless is received in the recess 45. Thereafter, when a reproduction operation is finished, the drive pin P1 comes off from the receiving hole 44 to be moved to an original position in a direction D. In synchronism with the movement of the drive pin P1, the useless pin P2 comes off from the receiving recess 47 to be moved to an original position in a direction C. At this time, the useless pin P2 is moved smoothly along the curved surface 42 of the slider 14. The disk cartridge C is used for a double-side disk which has a recording surface on each side of the disk. Therefore, when the disk cartridge C is turned over to be charged into the player, the drive pin P2 is inserted into the receiving hole 44 to open the shutter 10 while the pin P1 is inserted into the receiving recess 47 as a useless pin. The shutter 10 is automatically returned by the spring 23 to a closing state.

Fifth Embodiment

Figure 22:
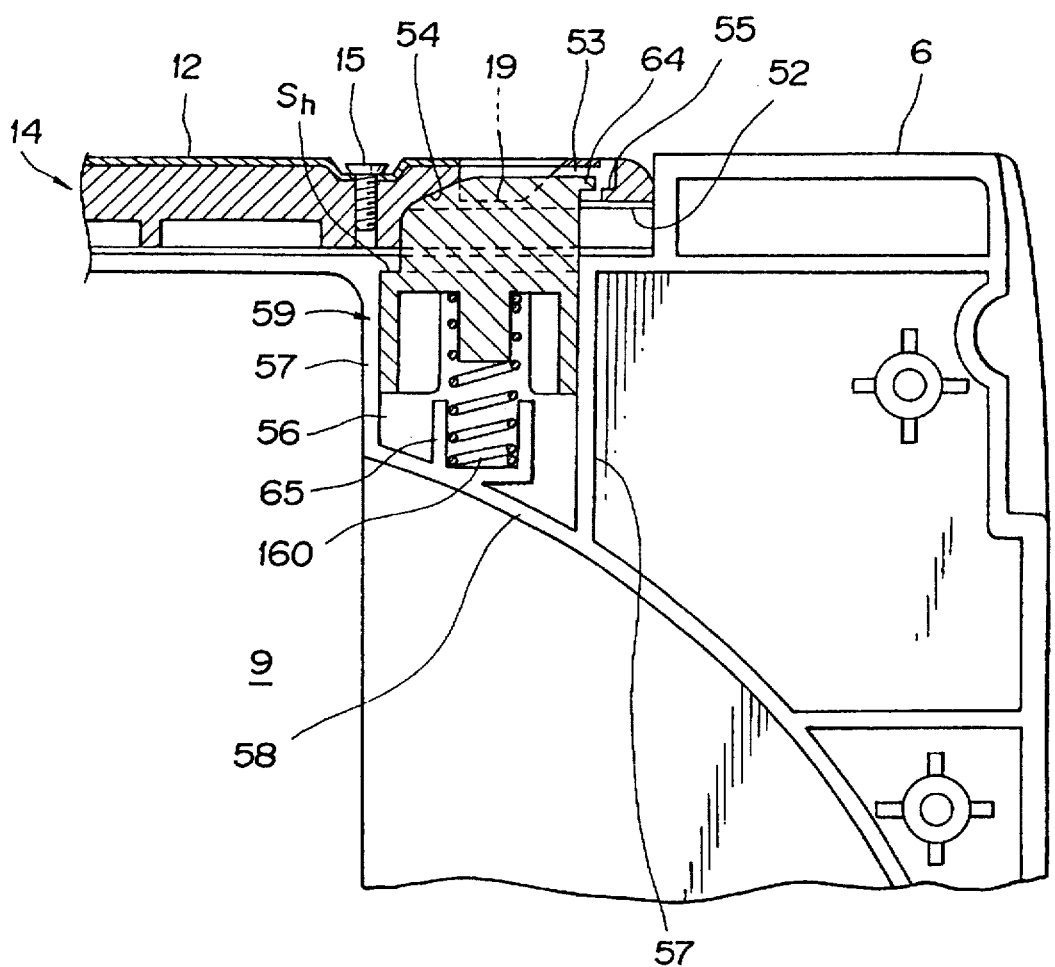
FIG. 22 is a longitudinally sectional view of a front part of the disk cartridge, showing a shutter locking mechanism.
Figure 23:
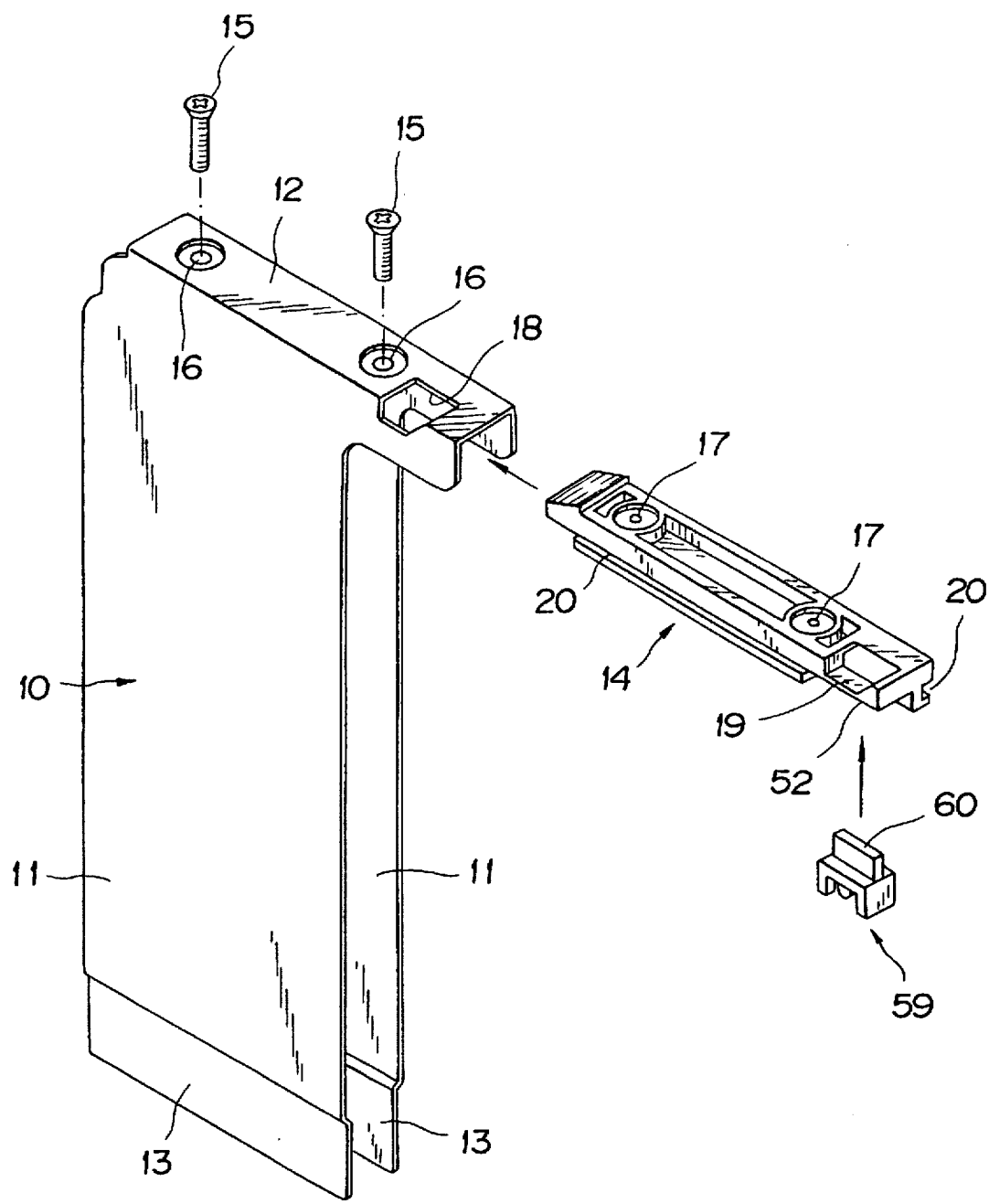
FIG. 23 is an exploded perspective view showing a state of engagement of the slider and a stopper for the shutter locking mechanism.
Figure 24:
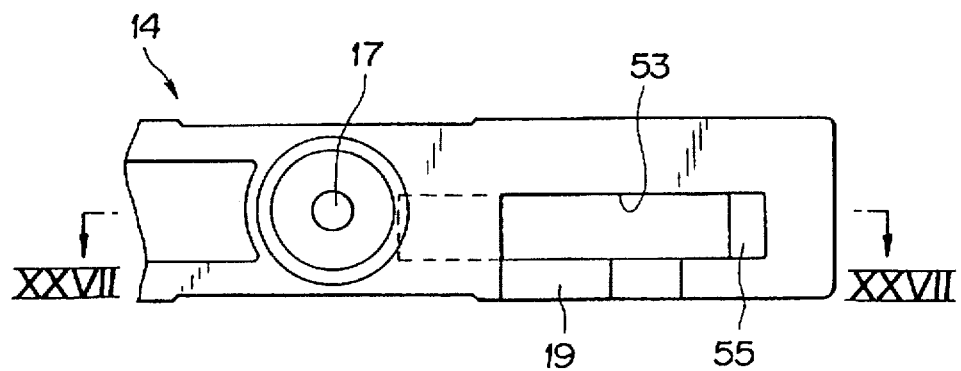
FIG. 24 is a plan view of a rear portion of the slider.
Figure 25:
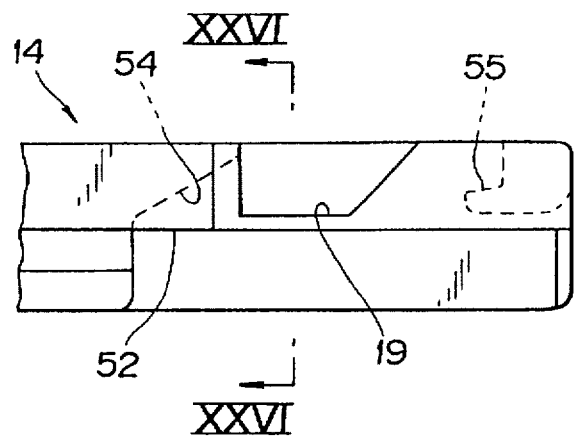
FIG. 25 is a side view of the rear portion of the slider.
Figure 26:
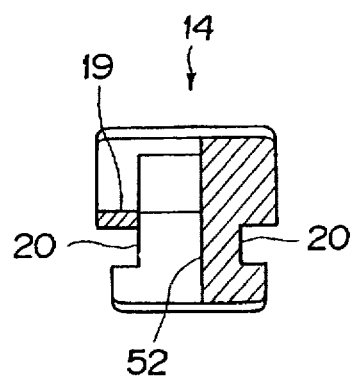
FIG. 26 is a cross sectional view taken along the line XXVI—XXVI.
Figure 27:
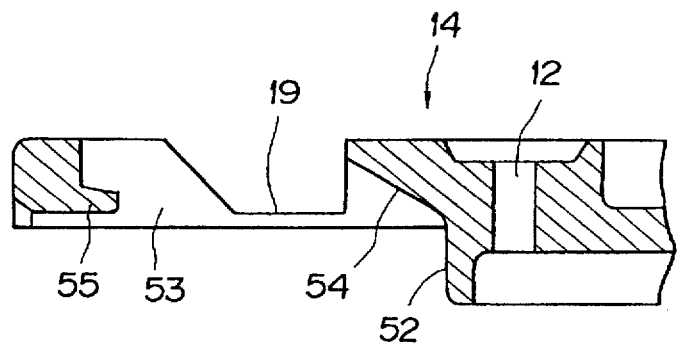
FIG. 27 is a longitudinally sectional view taken along the line XXVII—XXVII.
Figure 28:
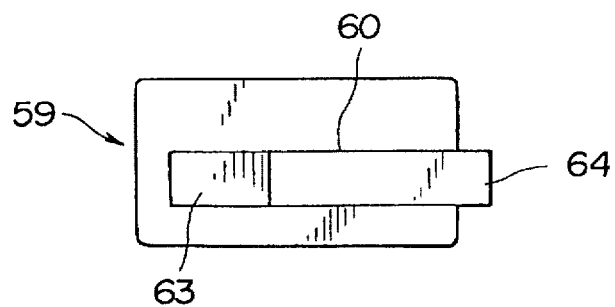
FIG. 28 is a plan view of the stopper for the shutter locking mechanism.
Figure 29:
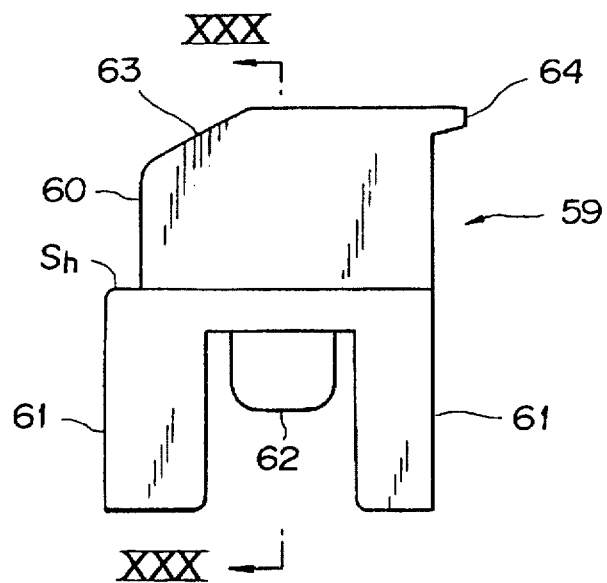
FIG. 29 is a side view of the stopper.
Figure 30:
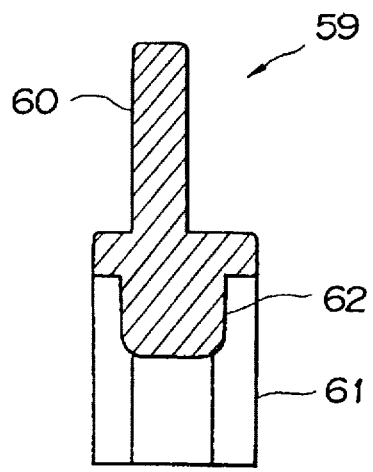
FIG. 30 is a cross sectional view taken along the line XXX—XXX.
Figure 31:
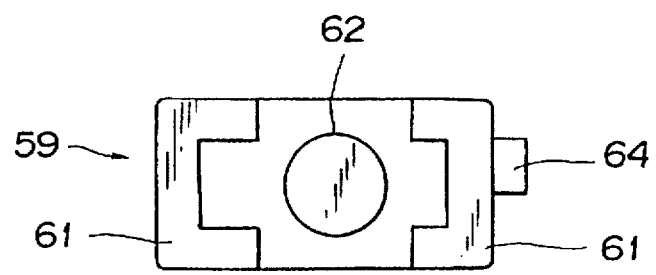
FIG. 31 is a bottom view of the stopper.
Figure 32:
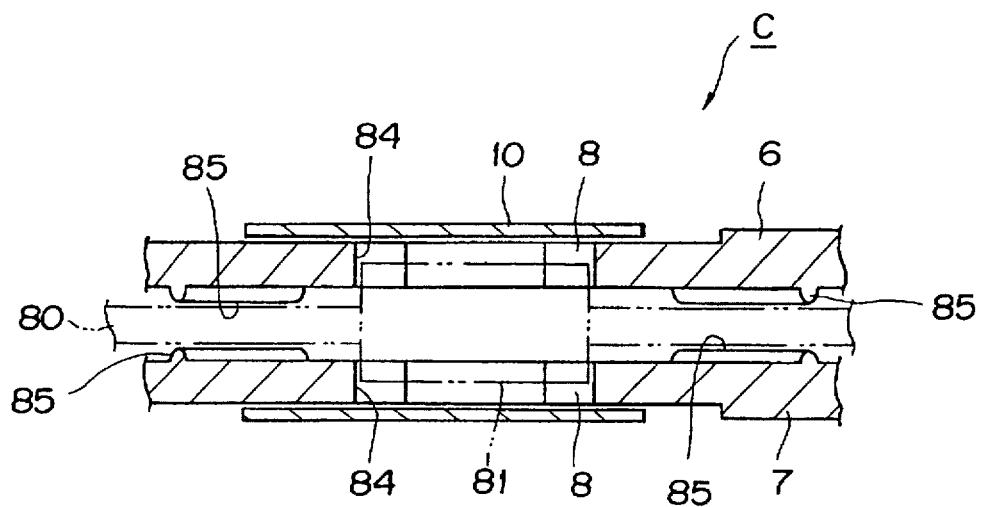
FIG. 32 is a cross sectional view of a center portion of the disk cartridge.

The shutter 10 is kept in a closing state by an urged force of the coil spring 23 and, however, the following shutter locking mechanism may be, as shown in FIGS. 22 to 31, provided for safe. That is, the slider 14 has, on the bottom side of the rear portion thereof, a cut away portion as shown in FIGS. 25 to 27. The cut away portion 52 extends from the rear end of the slider 14 to a portion slightly over the receiving recess 19 in the longitudinal direction of the slider 14 in a state wherein the left side of the rear portion of the slider 14, as viewed in FIG. 27, is cut away so as to form a stopping hole 53 open to the receiving recess 19. The stopping hole 53 extends to the upper surface of the slider 14 and has a length larger than that of the receiving recess 19 in the longitudinal direction of the slider 14. Further, the stopping hole 53 has, at its front and rear ends, a slanted ceiling wall 54 and a stopping piece 55, respectively. The disk cartridge C has a small room 56 at a position corresponding to the stopping hole 53 of the slider 14 when the shutter 10 is in a closing state. The room 55 comprises, as shown in FIG. 22, two guide walls 57, 57 extended in the longitudinal direction of the case and a part of the surrounding wall 58 surrounding the periphery of the disk. The room 56 has, therein, a stopper 59 and an elastic member 150 urging the stopper 59 upwardly.

The stopper 59 comprises, as shown in FIGS. 28 to 31, a plate-like head 60, two open legs 61, 61 and a projection 62 extended downwardly between the two open legs 61. The head 60 passes vertically through the stopping hole 53 and the cut away portion 52 to be projected into the receiving recess 19 of the slider 14, and has a slanted wall 63 and a stopping projection 64 on the front and rear sides on the top face thereof, respectively. The slanted wall 53 contacts the slanted ceiling wall 54 of the stopping hole 53 while the stopping projection 64 contacts the stopping piece 55. The elastic member 160 is a compressed coil spring which is provided between the projection 62 of the stopper 59 and a receiving space 65 at the bottom of the room 56 in order to urge the stopping member 59 toward the slider 14.

Next, the operation of the shutter locking mechanism will be explained with reference to the opening and closing movement of the shutter 10.

Figure 52:
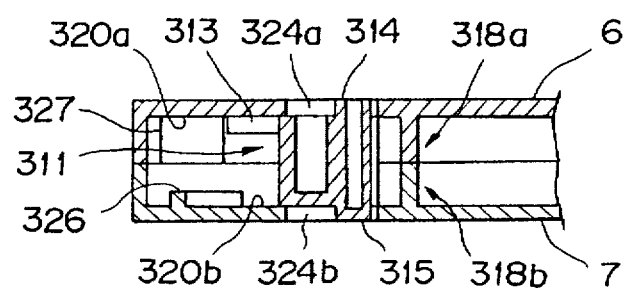
Figure 53:
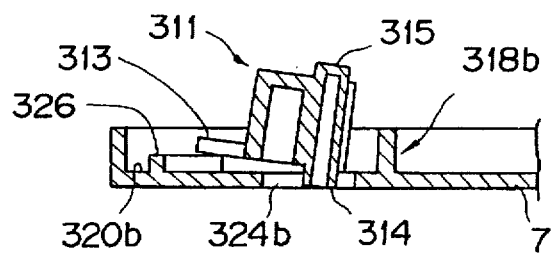
Figure 54:
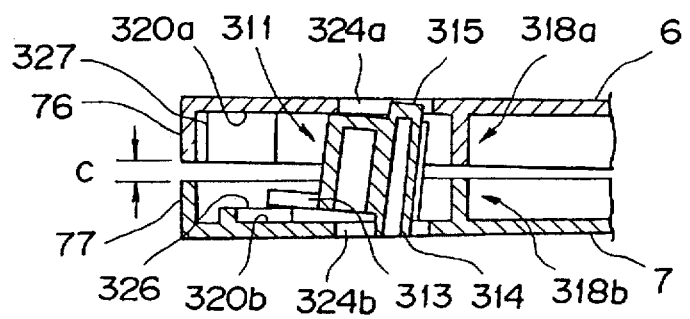

When the disk cartridge C is located outside of the player, that is, the disk cartridge C is not used, the shutter 10 is in a closing state wherein the opening portion of the case is closed by the function of the coil spring 23. At this time, the stopper 59 is, as shown in FIG. 52, pushed upwardly by the elastic member 160 toward the front end of the case in a state wherein the head 60 of the stopper 59 is accommodated in the stopping hole 53. Therefore, the slider 14 is fixed at a position where the shutter 10 is in a closing state, so that the shutter 10 is kept at its closing position. Even if an external force is exerted on the slider 14, the slider 14 is fixed at its closing position by the engagement of the stopping piece 64 of the stopper 59 with the stopping piece 55 of the slider 14. The stopper 59 is urged vertically by the spring 160 as viewed in FIG. 22 and, however, a shoulder Sh of the stopper 59 engages with a wall of the case. Therefore, even when the slider 14 is moved in its opening position, the stopper 59 is not pushed out of the room 56 by the spring 160.

When the disk cartridge C is charged into the player, the drive pin P1 is inserted into the receiving recess 19 thereby to press downwardly the head 60 of the stopper 59 against the spring force of the elastic member 60, resulting in that the stopper 59 is stopped at the lower portion of the cut away portion 52. At this time, the open legs 61, 61 are guided along the guide walls 57. With this state, the stopping piece 64 is released from the stopping piece 55 to enable the slider 14 to be moved in its opening direction (in the left direction as viewed in FIG. 22). In this manner, in a state wherein the drive pin P1 engages with the receiving recess 19, the slider 14 can be moved in the opening direction of the shutter 10 so as to be slid along the guide portion G of the case to open the opening portion of the case. Thereafter, when the drive pin P1 comes off from the receiving recess 19, the slider 14 can be moved in the closing direction of the shutter 10. The rear end face of the cut away portion 52 abuts against the slanted wall 63 of the stopper 59 shortly before the shutter is completely closed thereby to press slightly the stopper 59 into the room 56. When the slider 14 is moved to a position where the stopping hole 53 is opposed to the head 60 of the stopper 59, the head 50 is pushed upwardly into the stopping hole 53. Thus, the shutter 10 is again in a locked state. The above locking structure can prevent the shutter 10 from opening even when an impact force is imparted to the disk cartridge C.

Sixth Embodiment

Next, some holding ways of the disk in the disk cartridge will be explained.

As shown in FIGS. 32 to 35, the disk cartridge C has the upper and lower shell halves 6, 7 as mentioned above. The upper shell half 6 has a rectangular flat plate part 74 while the lower shell half 7 has a rectangular flat plate part 75. The flat plate part 74 has a peripheral side wall 76 and a substantially circular surrounding wall 78, and the flat plate part 75 has a side peripheral wall 77 and a substantially circular surrounding wall 79. The two side walls 76, 77 and the two surrounding walls 78, 79 are opposed to each other when the upper and lower shell halves are assembled together.

At the center portion of the case comprising the two shell halves is provided the spindle insertion hole 8 into which a spindle S is inserted to absorb a hub 81 of a disk 80 thereby to rotate the disk 80. The head insertion hole 9 is provided adjacent to the spindle insertion hole 8. At two positions separated from the respective peripheries of the spindle insertion holes 8, 8 of the both shell halves 6, 7 are provided two annular projections each projected toward a non-recording surface of the disk 80. When the disk cartridge C is transferred, the disk 80 is stably supported by one of the annular projections 85, 85. In this case, since one of the annular projections 85 contacts the non-recording surface thereof, the quality of a recording surface thereof is maintained.

The upper shell half 6 has, at its corners, a plurality of male projections 91, 91 . . . 91 each having a screw hole 92 for receiving a fastening screw while the lower shell half 7 has a plurality of female projections 93, 93 . . . 93 formed at the positions corresponding to those of the male projections 91. Each female projection 93 has a hole 94 for receiving one of the male projections 91.

Figure 36:
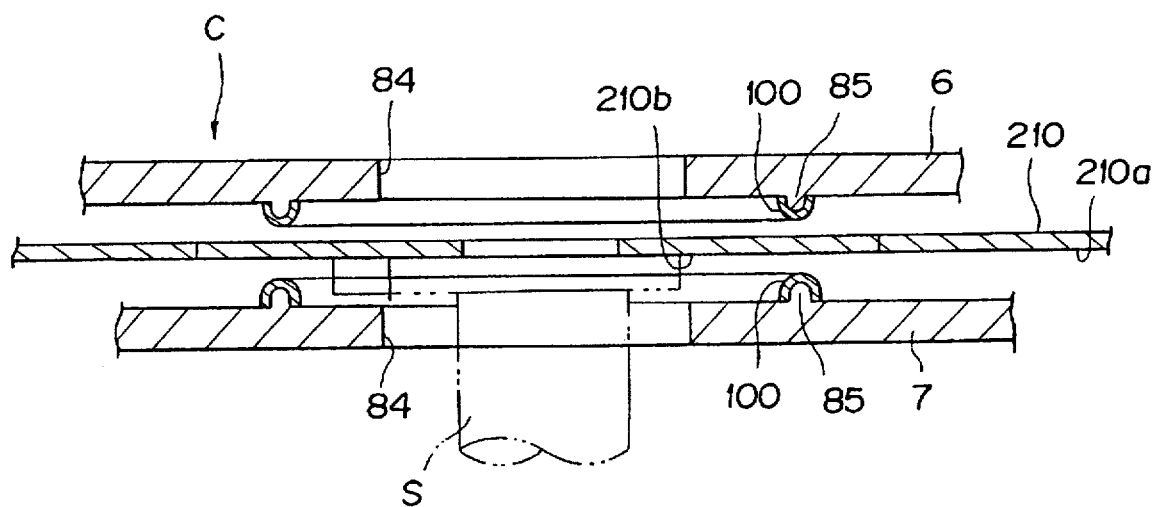
FIG. 36 is a cross sectional view of a center portion of the disk cartridge, showing other embodiment.

In FIG. 36, a disk 210 accommodated in the disk cartridge C is made of synthetic resin such as polycarbonate or the like. On the side of the lower shell half 7 is provided a recording surface 210a outside of a non-recording surface 210b around the spindle insertion hole 8. The projections 85, 85 are opposed to the non-recording surface 210. Each projection 85 may have an outer layer 100 made of thermoplastic elastomer as an elastic member, which has a slippery property better than polycarbonate and is softer than that. The layer 100 and the projection 85 are formed separately through an injection molding. Further, each projection 85 has an arched shape in cross section on the side of the disk 210. Each outer layer 100 may be formed with nitrile butadiene rubber (NBR) or ethylene-propylene rubber (EPM) which is formed separately from the projections 85 so as to be engaged therewith or attached thereto by adhesive. In addition, polyacetal having a slippery property may be used as the outer layer 100. The polyacetal layer is formed separately from the projection 85 through injection molding. If the disk cartridge C is formed with polyacetal, it can obtain a good wear-resisting property, and, however, cannot obtain a good heat resistance. Accordingly, it is not desirable that the whole part of the disk cartridge C is made of polyacetal.

Figure 37:
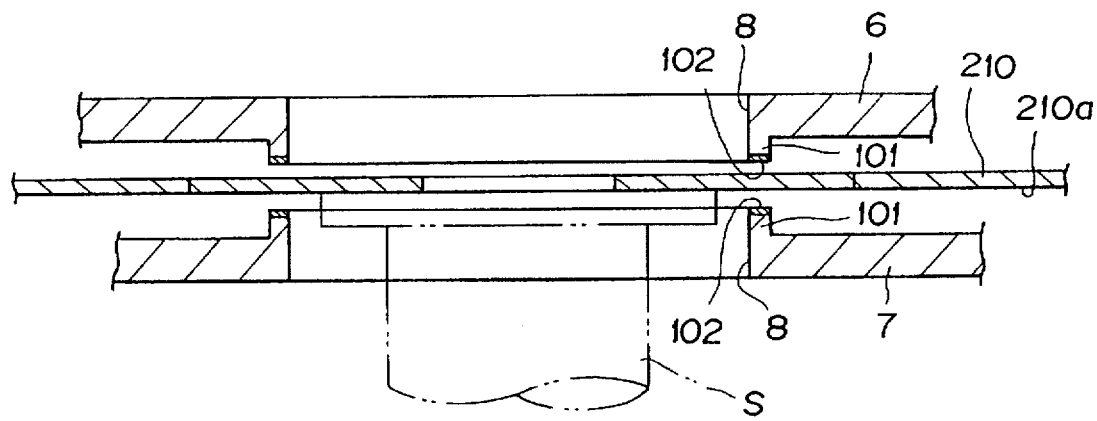
FIG. 37 is a cross sectional view of a center portion of the disk cartridge, showing still other embodiment.

In FIG. 36, the projection 85 is formed at a position separately from the periphery of the spindle hole 8. However, in consideration of only prevention of wear of the disk and elastic support thereof, the outer layer 100 may be formed on a conventional projection provided at the edge of the spindle insertion hole 8. That is, as shown in FIG. 37, fluoro resin (coating layer) may be attached to the top surface of two annular projections 101, 101 each formed adjacent to the periphery of the spindle insertion hole 8.

Figure 38:
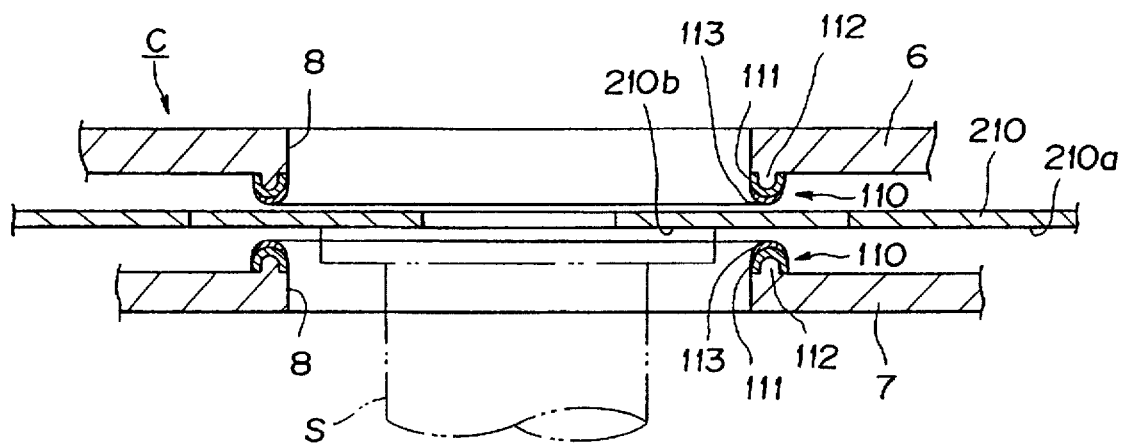
FIG. 38 is a cross sectional view of a center portion of the disk cartridge, showing still other embodiment.
Figure 39:
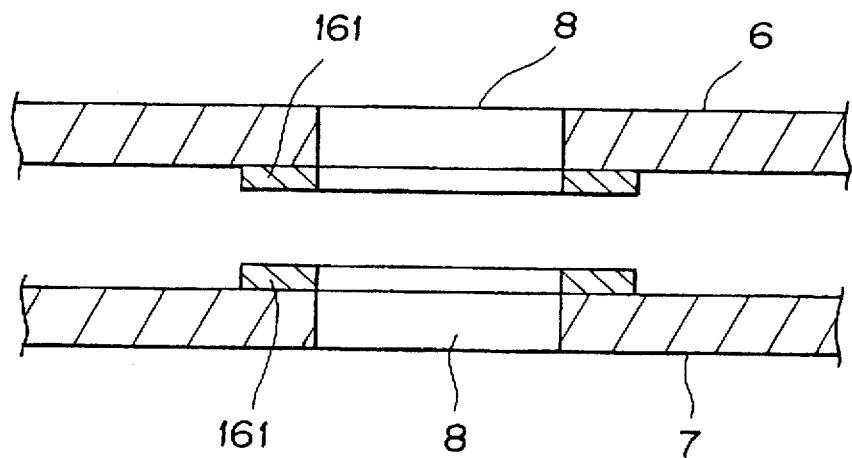
FIG. 39 is a cross sectional view of an annular projection provided on the center portion of each of the upper and lower shell halves.

Further, FIG. 38 shows two annular projections 110, 110 each having an intermediate layer 111 as an elastic layer made of thermoplastic elastomer with which an annular base projecting portion 112 made of polycarbonate is covered, and an outer layer 113 made of fluoro resin having a slippery property with which the intermediate layer 111 is coated. Each projection 110 has an arched shape in cross section. The intermediate layer 111 is formed separately from the base projecting portion 112.

In general, a hard coating process is performed on the surface of the disk for protection of the surface while the disk is rotated. However, coating material is not attached onto the center portion of the disk because of rotational centrifugal force exerted on the coating material. Therefore, each annular projection mentioned above can prevent a non-coated surface of the disk from contacting the inner surface of the case of the disk cartridge thereby to avoid wear, damage or scratches on the disk and the case. When the spindle S is stopped to be retracted from the hub of the disk, the disk 210 continues its rotation under its inertia force. At this time, the non-recording surface 210b contacts the annular projections 85, 101, 110. However, since the projections are not only covered with the outer layers 100, 102, 113 each having a slippery property, respectively, but also formed in an arched shape in their cross section, a wear between the disk and the projections can be effectively avoided.

Instead of the above annular projections, an annular film 161 made of a slippery material such as PET may be attached onto the periphery of the spindle insertion hole 8 in order to avoid generation of scratches on the disk.

Seventh Embodiment

Figure 40:
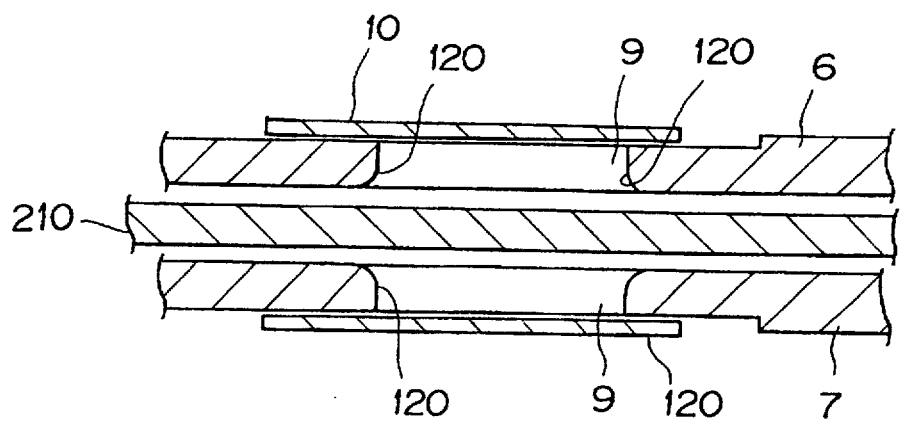
FIG. 40 is a cross sectional view taken along the line XXXX—XXXX.

FIG. 40 shows a cross sectional view of the head insertion hole 9 whose inner edge is formed in an arched shape by a chamfering operation. In this manner, if each chsmfered edge is provided at the inner edge of the head insertion hole 9, generation of scratches or cracks onto the surface of the disk can be effectively avoided even when the disk abuts against the edge.

Eighth Embodiment

Figure 41:
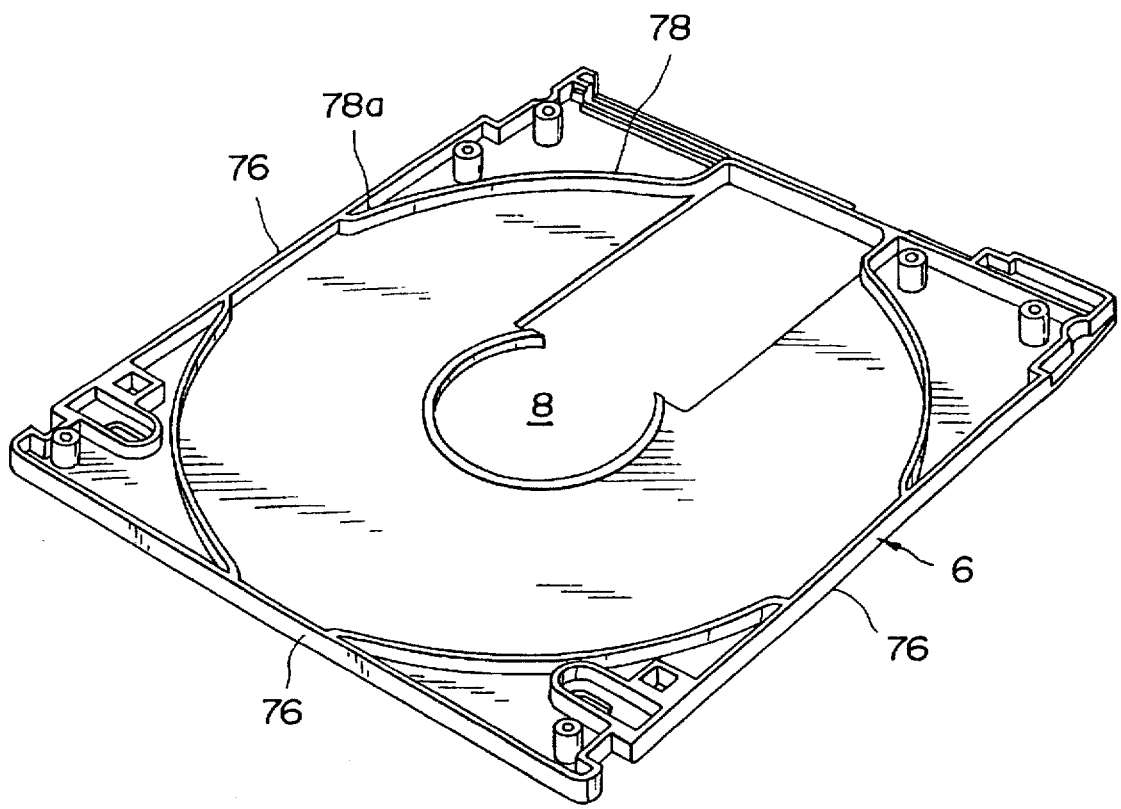
FIGS. 41 and 42 are two perspective views of the upper and lower shell halves, showing other embodiment of a surrounding wall for receiving a disk, respectively.
Figure 42:
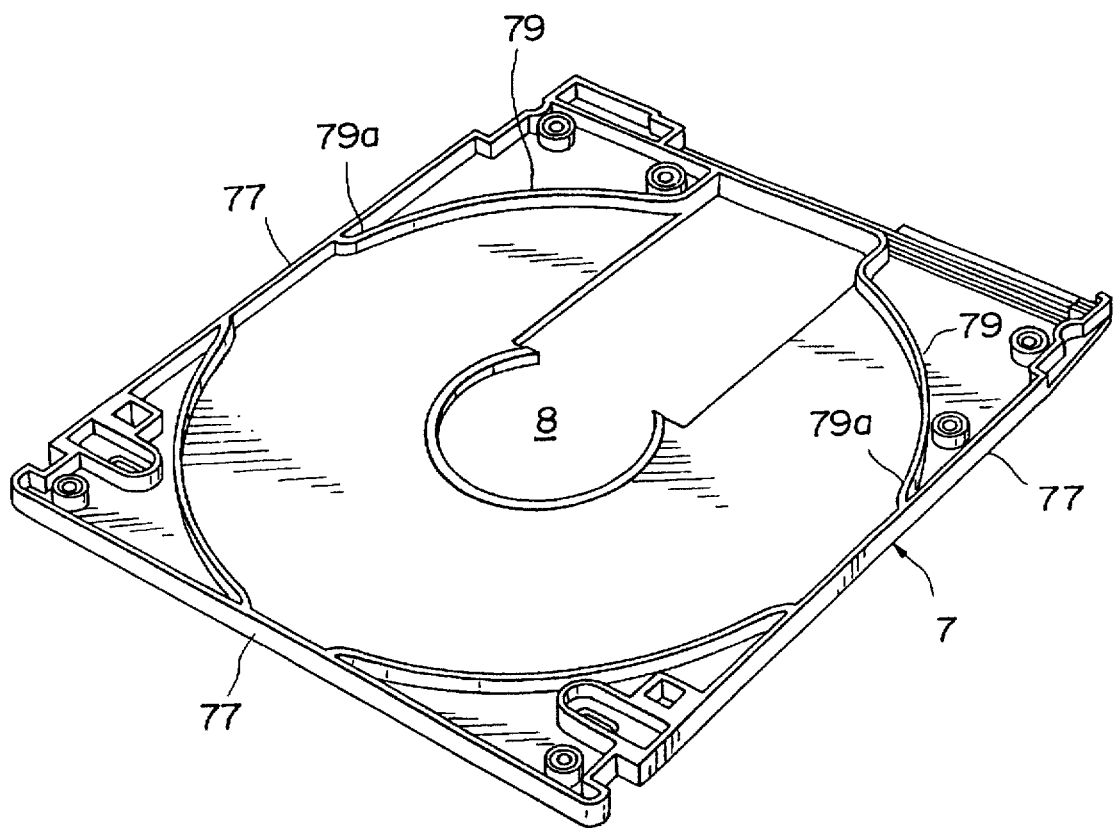
Figure 43:
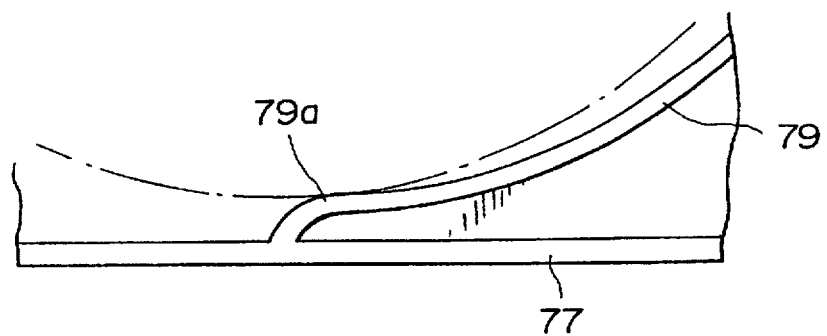
FIG. 43 is an enlarged plan view of a joint part between the surrounding wall and a side wall of the lower shell half.

As shown in FIGS. 41 to 43, the surrounding walls 78, 79 of the upper and lower shell halves 6, 7 have joint portions 78a, 79a for connecting them to the side peripheral walls 76, 77, respectively. Each of the joint portions 78a, 79a have a chamfered, arched or curved shape which can eliminate generation of wear, scratches or cracks on the joint portion and the periphery of the disk especially when the disk is dropped or transferred.

The distal end of the joint portions 78a, 79a may be slightly separated from the peripheral side walls 76, respectively.

Ninth Embodiment

Figure 44:
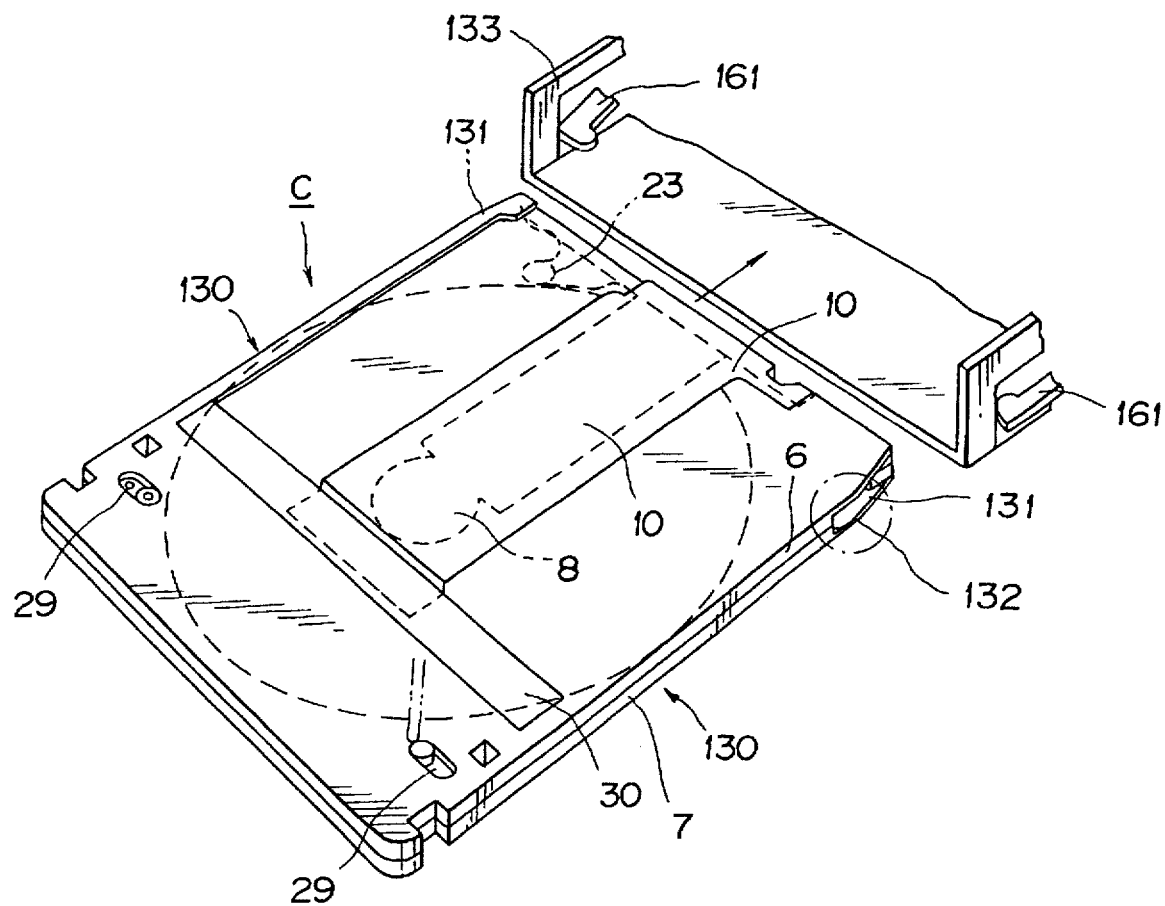
FIG. 44 is a perspective view of the disk cartridge and a guide frame of a reading/writing device when the disk cartridge is charged into the guide frame thereof.
Figure 45:
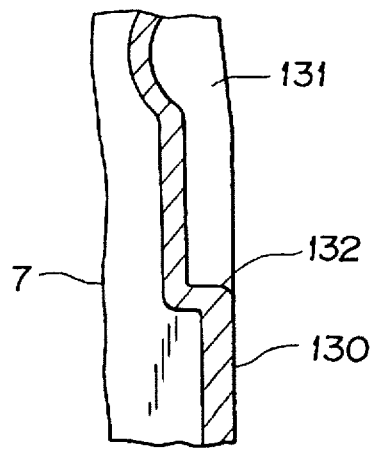
FIG. 45 is a partially longitudinal view of a front portion of the side wall of the disk cartridge.

In FIG. 44, the both side walls 130, 130 of the disk cartridge C have two respective guide grooves 131, 131 with which two drawing arms 162, 162 for drawing the cartridge C into a guide frame 133 provided in the player are engaged, respectively. Each of the guide recess 131 is extended in the front and rear directions and is located near the front end of each side wall thereof. Each recess 131 comprises two parts, each of which is provided in one shell half. At the rear end of each groove 131 is, as shown in FIG. 45, provided a chamfered corner having an arched shape to prevent the inner surface of the guide frame 133 from catching the corner of each groove 131 thereby to ensure a smooth charging operation of the cartridge C when the disk cartridge C is charged into the player.

Tenth Embodiment

Figure 47A:
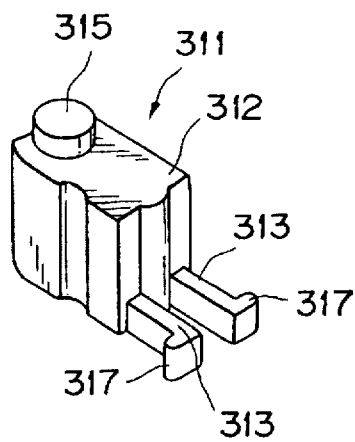
FIGS. 47(a) and (b) are two perspective views of a movable plug as viewed in two directions opposite to each other, respectively.
Figure 47B:
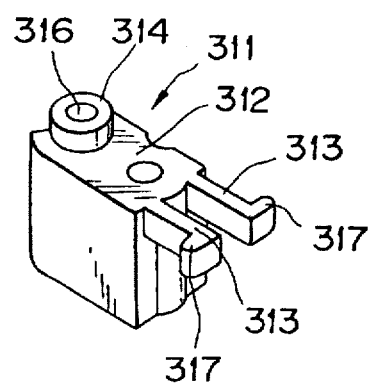

The disk cartridge C has a pair of writing protection mechanisms 29a, 29b on the right and left sides at the rear part of the cartridge C, respectively. The mechanism 29a is for an upper surface of the disk while the mechanism 29b is for a lower surface of the disk. Each of the mechanisms 29a, 29b has, as shown in FIG. 47, a movable plug 311. The plug 311 has a block-like main body and a pair of legs 313, 313 extended from one end surface of the main body in its moving direction thereof. In the two mechanisms, the same plug 311 is used in a state wherein the way of assembling them is reversed to each other. The main body 312 has two circular projections 314, 315 on its upper and lower faces. The projection 314 has a hole 316 into which a tool is inserted when the plug 311 is moved for protection of writing. The two legs 313, 313 are extended parallel to each other and have two stopping pieces 317, 317 directed outwardly at their distal ends, respectively.

Figure 48A:
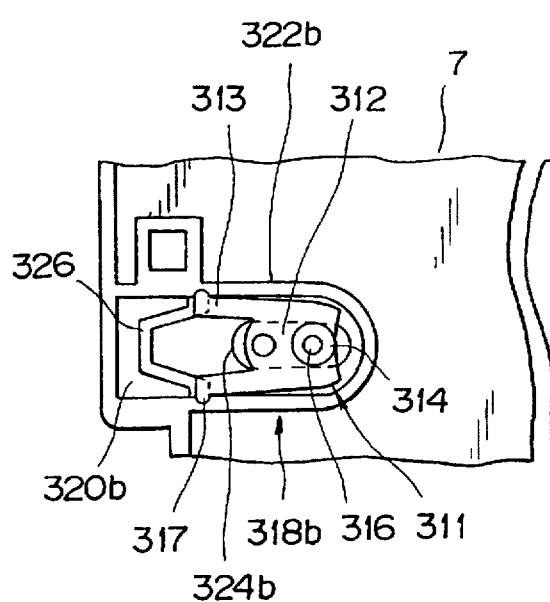
FIGS. 48(a) and (b) ape two plan views of two guide portions fop the left and right plugs on the left and right sides of the lower shell half, respectively.
Figure 48B:
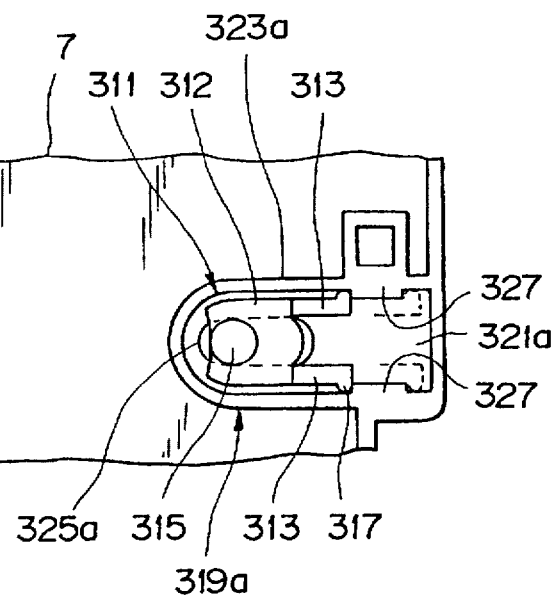
Figure 49:
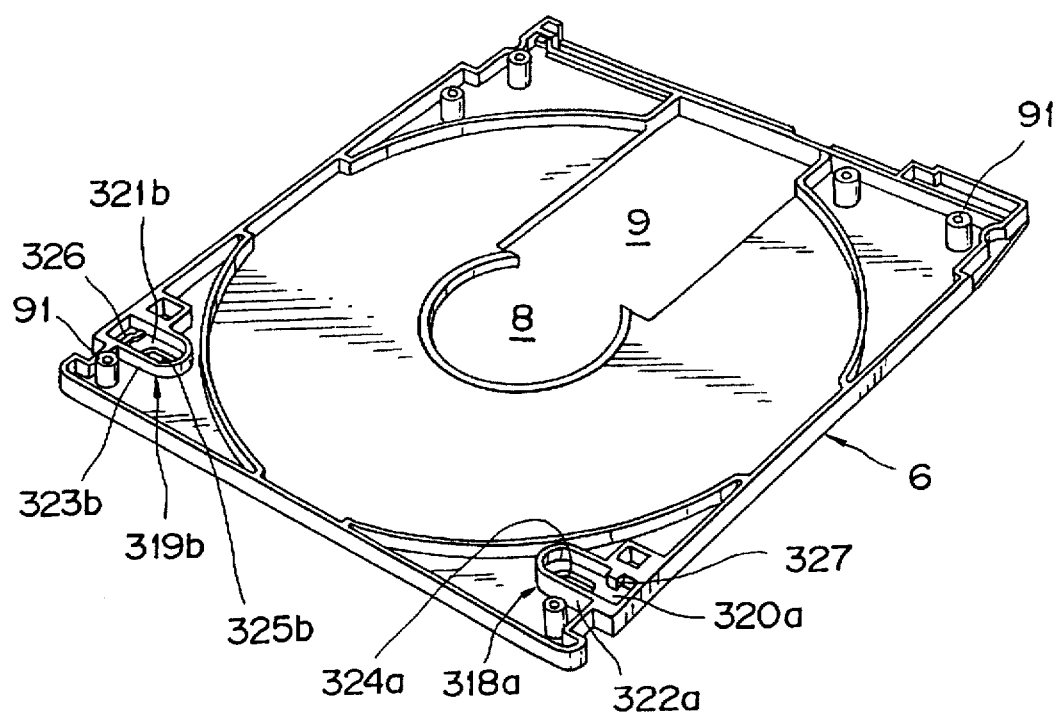
FIG. 49 is a perspective view of the inner side of the upper shell half having two guide portions for the two protection plugs.

The writing protection mechanisms 29a, 29b have, in FIG. 48, two divided guide parts 318b, 319a for holding movably the plugs 311 on the lower shell half 7 and, in FIG. 49, two divided guide parts 319b, 318a. These guide parts are joined together to form a pair of guide parts 500, 501 (FIG. 46) in which the plugs 311 are movably held. That is, the divided guide parts 318a, 319b of the upper shell half 6 are joined together with the divided guide parts 318a, 319b, respectively, to form two rooms, one of which is composed of a pair of flat walls 320a, 320b and a pair of upright walls 322a, 322b, the other of which is composed of a pair of flat walls 321a, 321b and a pair of upright walls 323a, 323b.

The upright walls 322a, 322b for one room and the upright walls 323a, 323b for the other room are opposed to each other, respectively.

The upright wall 322a of the upper shell half has, at its inner surface, two projections 327, 327 for cooperating with the plug 311 for the mechanism 29b while the upright wall 323a of the lower shell half has, at its inner surface, two projections 327, 327 for cooperating with the plug 311 for the mechanism 29a. Each projection 327 has a predetermined width, and its left and right ends are engaged with the stopping projection 317 of the leg 313. That is, each plug 311 can take two positions, i.e., a non-operating position which is indicated by a solid line and an operating position which is indicated by a dotted line in FIG. 48(b). The plug 311 is selectively fixed at the two positions by the function of the two projections 317, 327 cooperating with the legs 317 of the plug 311.

The flat walls 320a, 320b, 321a, 321b have four elongated openings 324a, 324b, 325a, 325b. A pair of the openings 324a, 324b of the flat walls 320a, 320b and a pair of the openings 325a, 425b of the flat walls 321a, 321b are opposed to each other, respectively, when the upper and lower shell halves 6, 7 are assembled. The two elongated openings in each pair are communicated with each other and closed to each other in response to the movement of the plugs 311. The flat wall 320b of the lower shell half 7 for the writing protection mechanism 29b and the flat wall 321b of the upper shell half 6 for the writing protection mechanism 29a are provided with two raised portions 326, 326, respectively. In the case that each plug 311 is properly assembled in each of the mechanisms 29a, 29b, the surfaces of the main body of the plug 311, which have no legs 313 contact the flat walls 320b, 321b, respectively, and each raised portion 326 is provided on each flat wall at a position where it does not obstruct the left and right movement of each plug 311.

The assembly of the writing protection mechanisms will now be explained.

Figure 51:
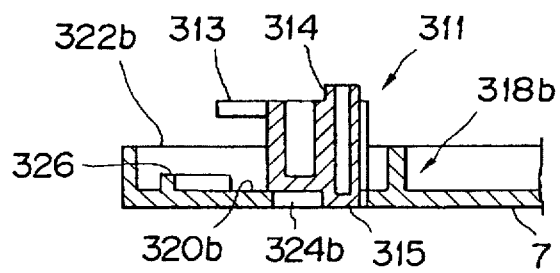
FIGS. 51 to 54 are four explanatory views showing a function of the writing protection mechanism, respectively.

Before the assembly of the upper and lower shell halves 6, 7, the two plugs 311, 311 are, as shown in FIG. 51, inserted into the respective left and right divided guide parts 318b, 319a.

At this time, the left movable plug 311 stands upright as shown in FIG. 51, with the projection 315 being accommodated in the opening 324b, and with the legs 313 being located over the raised portion 326. In contrast, the right movable plug 311 stands upright with the projection 314 opposite to the projection 311 being accommodated in the opening 325a and with the legs 313 being accommodated in the guiding portion 319a.

Figure 33:
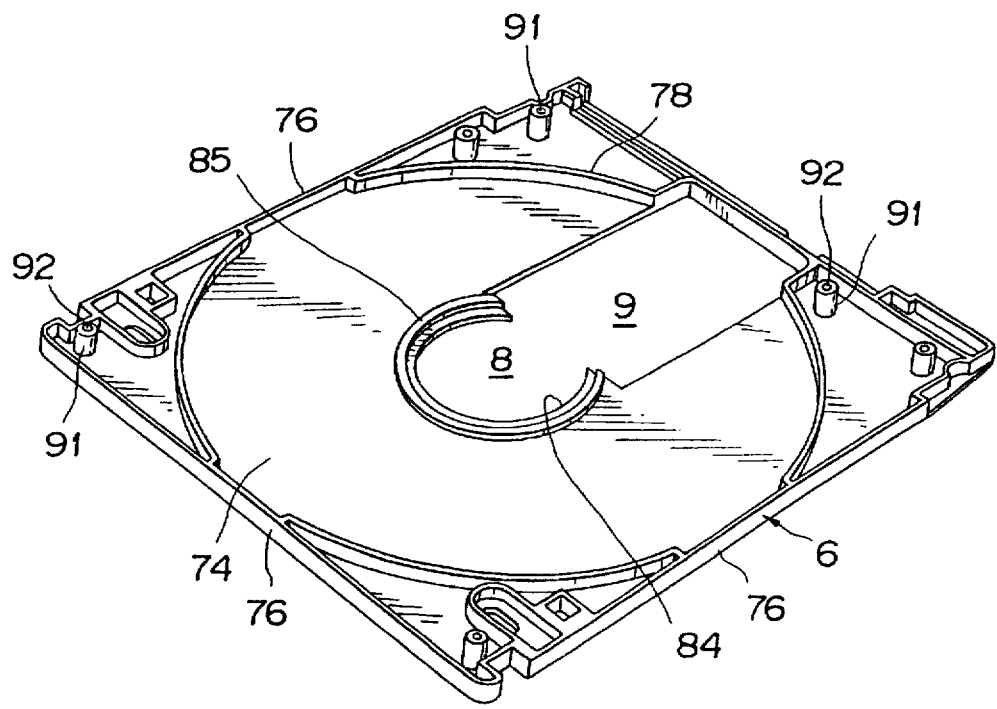
FIG. 33 is a perspective view of an inner side of an upper shell half.
Figure 34:
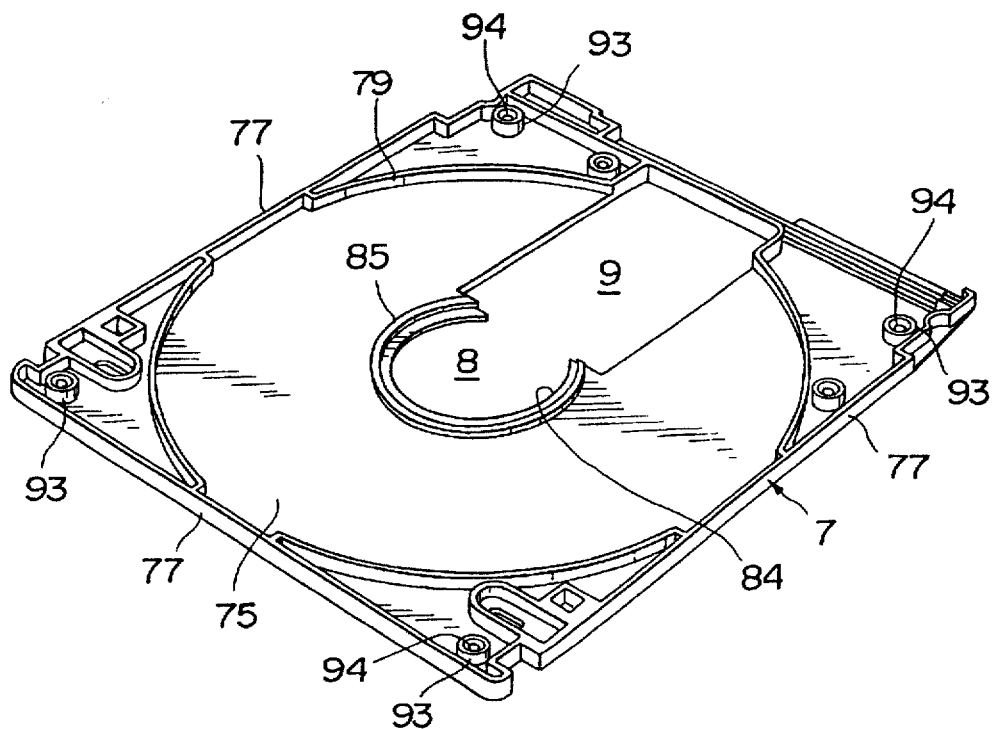
FIG. 34 is a perspective view of an inner side of a lower shell half.
Figure 35:
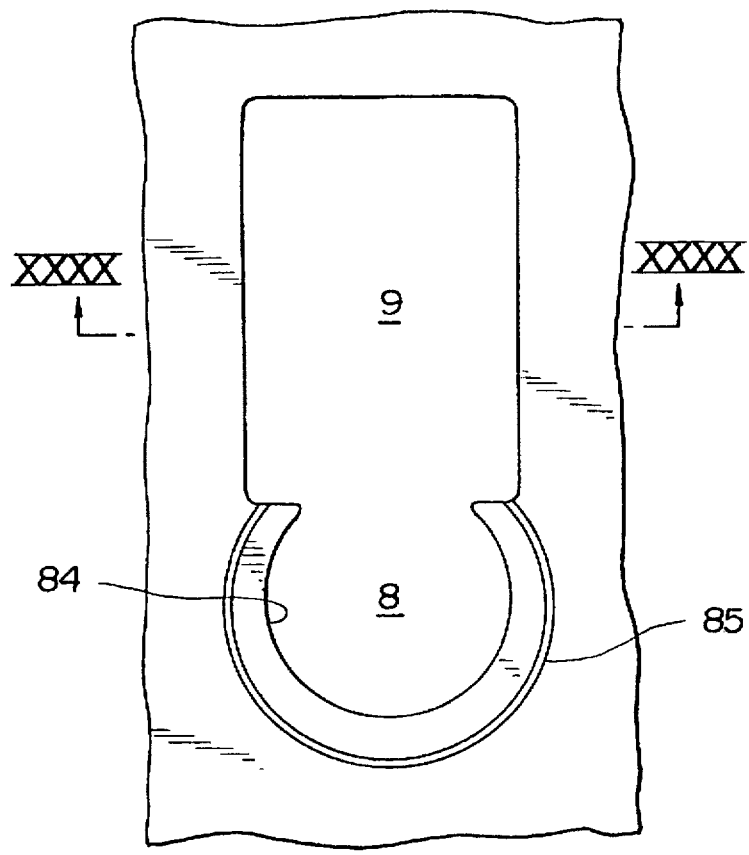
FIG. 35 is a plan view of a center portion of either the upper or lower shell half.

At the same time, the disk is accommodated in the case. Thereafter, the upper shell half 6 is, as shown in FIG. 52, assembled onto the lower shell half 7 in such a manner that the female projections 93 of the lower shell half 7 receive the male projections 91 of the lower shell half 6, respectively (FIGS. 33 and 34). At this time, the projection 314 of the left plug 311 is received in the opening 324a of the upper shell half 6 with the legs 313 contacting the flat wall 320a while the projection 315 of the right plug 311 is received in the opening 325b with the legs 313 contacting the flat wall 321a. Thus, the writing protection mechanisms 29a, 29b are assembled.

However, there is a case that the plug 311 may be inserted upside down in the guided portion 500 or 501. At that time, the legs 313 ride on the raised portion 326 of the flat wall 320b or 321b, resulting in that the plug 311 stands obliquely. If the upper shell half 6 is put on the plug 311 obliquely, the side wall 76 of the upper shell half 66 is floated from the side wall 77 of the lower shell half 77 to generate a clearance C between the two side walls 76, 77. In this manner, a worker or an operator can detect the insertion miss of the plug 311 thereby to correct the posture of the plug 311.

Figure 46:
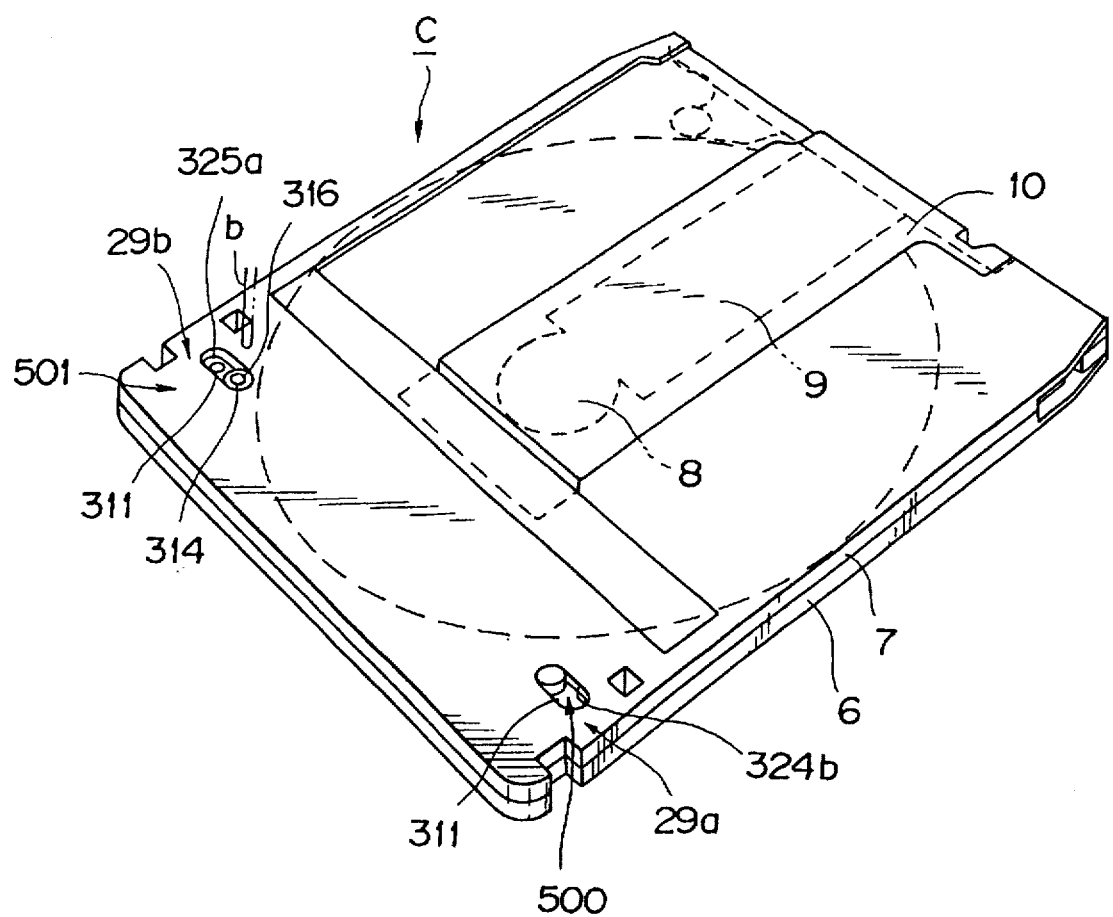
FIG. 46 is a perspective view of the disk cartridge having a writing protection mechanism.

When the two writing protection mechanisms 29a, 29b are correctly assembled, the protection mechanism 29a functions to protect writing of information onto the front surface of the disk while the mechanism 29b functions to protect it onto the back surface thereof (FIG. 46 is a perspective view of the case as viewed from the back side thereof). The plug 311 of the mechanism 29a is held in a state wherein the projection 314 having the insertion hole 316 is directed downwardly while the plug 311 of the mechanism 29b is held in a state wherein the projection 314 having the insertion hole 316 is directed upwardly (FIG. 46).

When the mechanism 29b for the back surface of the disk is operated, a pin is inserted into the hole 316 of the projection 314 of the plug 311 to move the plug 311 in the left direction, as viewed in FIG. 46, while the engaging projections 317 of the legs 313 ride over the engaging projections 327.

As a result, a part of the opening 325a of the upper shell half 6 is communicated with a part of the opening 325b to form a through hole into which a detection pin b provided in the player is inserted to protect its writing. The operation of the opposite mechanism 29a for the front surface of the disk surface of the disk is performed in the same manner.

In this embodiment, the disk cartridge C is fop a double-side disk. However, one writing protection mechanism is used in the case of a one-side disk.

The above structure of the mechanisms 29a, 29b makes it possible to easily find out the incorrect insertion of the plug by mistake.

Eleventh Embodiment

A mold for forming the disk cartridge will now be explained.

Two molds are prepared for the upper and lower shell halves 6, 7.

Figure 55:
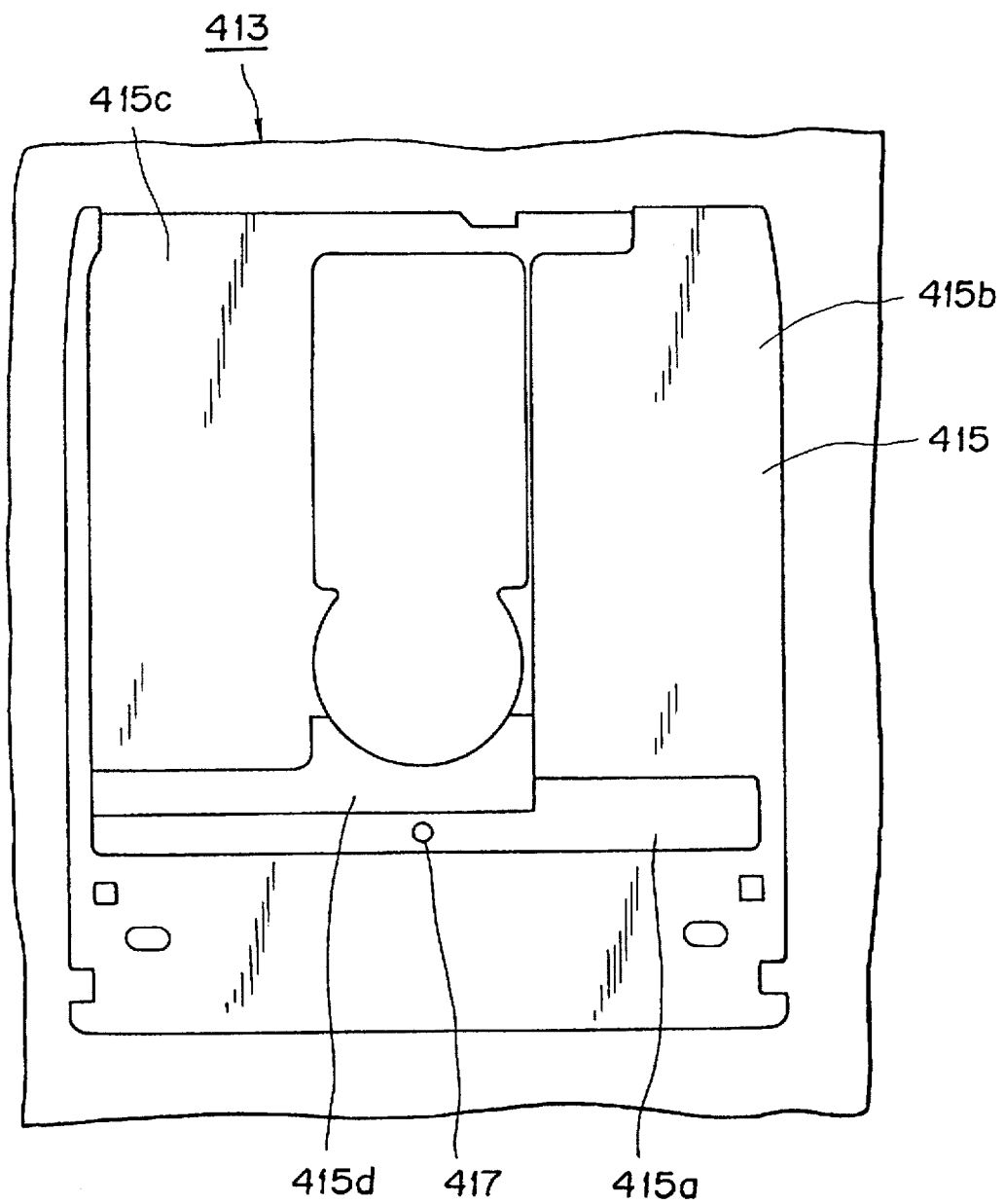
FIG. 55 and 56 are two plan views of two half molds assembled opposite to each other for forming the upper shell half, respectively.
Figure 56:
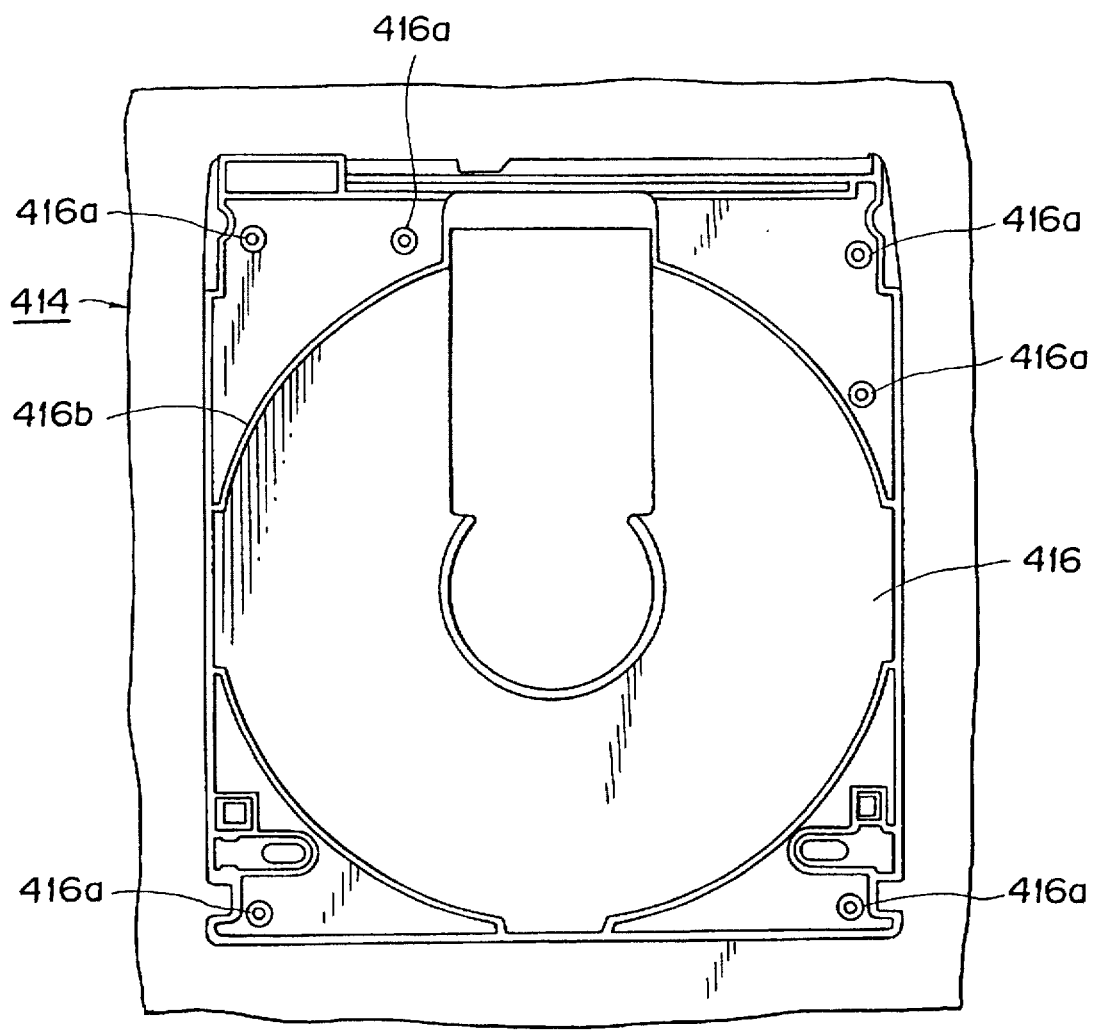
Figure 57:
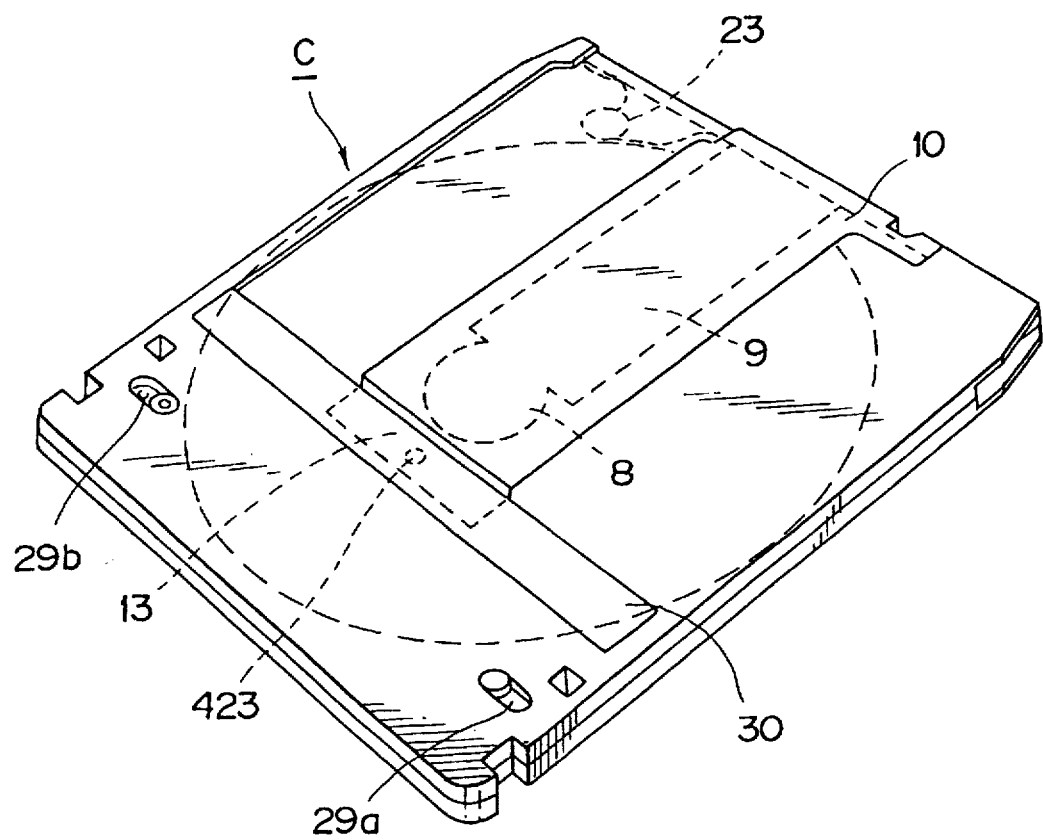
FIG. 57 is a perspective view of the disk cartridge having a trace of an injection hole of an injection mold.

First, the mold for the upper shell half 6 will be explained. The mold comprises, as shown in FIG. 55, a half mold 413 shown in FIG. 55 and a half mold 414 shown in FIG. 56. The half mold 413 has a cavity with a shape corresponding to an outer shape of the upper shell half 6 while the half mold 414 has a cavity 416 with a shape corresponding to an outer shape of the inner shape of the upper shell half 6. When the two cavities are combined together to form a single cavity for forming the upper shell half 6.

The half mold 413 is provided with a single gate 417 (injection hole), at a position deviated from the center of the cavity 415. The position corresponds to a position 415a where the retaining plate 30 is attached to the surface of the case in order to guide the slide plate 13 of the shutter 10. The cavity 415 is provided with a flat forming part 415c and a guide groove forming part 415 in addition to the retaining plate attaching groove 415a. The half mold 414 comprises a plurality of forming parts 416a, 416a . . . 416a located at four corners of the cavity 416 and surrounding wall forming part 416b for forming the surrounding wall 78.

When the upper shell half 6 is formed by the two half molds 413, 414, they are combined to form the cavity corresponding to the upper shell half 6, into which a melted synthetic resin such as polycarbonate or the like is injected through the injection hole 417.

In the case of a 5-inch disk cartridge, the diameter of the injection hole 417 is determined at 1.5 mm. The injection conditions are as follows.

Mold temperature: 80° to 90° C.

Injection pressure: 1500 to 1600 kg/cm$^2$

Melted resin temperature: 250° to 280° C.

The mold for the lower shell half 7 has a similar construction.

After an injection forming is performed, a gate trace 423 is covered with the retaining plate 30 on each shell half. Further, if each shell half is formed by the mold having a single injection hole 417 in this manner, there is no weld pattern on the surface of the case, which is a wave-form pattern formed at a position where melt resins flown into the cavity from different injection holes are joined. Therefore, a good outer appearance is obtained.

In each embodiment, various disk cartridges for accommodating a disk having a diameter of 5 inches are explained, and, however, this invention can be adapted to other disk cartridges, e.g., a disk cartridge for a 3.5-inch disk.

What is claimed is:

1. A disk cartridge with a case comprising upper and lower shell halves assembled with each other to hold a disk therebetween, the case having a head insertion hole for receiving a reading/writing head adjacent a spindle insertion hole at center of the case for receiving a spindle for rotating the disk, a groove on each side of a peripheral wall of the case for receiving a drawing arm provided in a guide frame of a reading/writing device to draw the case thereinto and a pair of projections provided inwardly at a joint portion between the head insertion hole and the spindle insertion hole, the improvement in which each projection at the joint portion between the head and spindle insertion holes has a triangular shape comprising a straight portion projected inwardly and almost perpendicularly to an edge portion of the head insertion hole and an arched portion forming part of an edge of the spindle insertion hole, an almost annular projection is provided along a periphery of the spindle insertion hole, the projection being opposed to a non-recording surface of the disk and being chamfered to form an arched shape in cross-section, and inner peripheral walls of the head insertion hole are chamfered, a corner of the groove being chamfered to prevent the corner of the groove from being caught by a part of the guide frame.

2. A disk cartridge according to claim 1, wherein each half shell has a circular surrounding wall on its inner wall for accommodating the disk, a joint portion between a side peripheral wall and the surrounding wall being curved or chamfered.

3. A disk cartridge according to claim 1, wherein the almost annular projection is formed at the periphery of the spindle insertion hole.

4. A disk cartridge according to claim 1, wherein the almost annular projection is formed at a position outwardly separated from the periphery of the spindle insertion hole, opposite ends of the annular projection finishing at a root portion of each triangular projection.

5. A disk cartridge according to claim 3, wherein the almost annular projection has a slippery property.

6. A disk cartridge according to claim 4, wherein the almost annular projection has a slippery property.

* * * * *